(12) United States Patent
Uzaki et al.

(10) Patent No.: US 11,917,218 B2
(45) Date of Patent: Feb. 27, 2024

(54) SERVER, AND ADVERTISEMENT SETTING METHOD

(71) Applicant: JVCKENWOOD Corporation, Yokohama (JP)

(72) Inventors: Jiro Uzaki, Yokohama (JP); Mizuki Ohara, Yokohama (JP); Naoyuki Okada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/876,618

(22) Filed: Jul. 29, 2022

(65) Prior Publication Data

US 2022/0368964 A1    Nov. 17, 2022

Related U.S. Application Data

(63) Continuation of application No. PCT/JP2020/046828, filed on Dec. 15, 2020.

(30) Foreign Application Priority Data

Mar. 3, 2020 (JP) .................................. 2020-036177

(51) Int. Cl.
*H04N 21/234* (2011.01)
*H04N 21/4788* (2011.01)
*H04N 21/81* (2011.01)

(52) U.S. Cl.
CPC ... *H04N 21/23424* (2013.01); *H04N 21/4788* (2013.01); *H04N 21/812* (2013.01)

(58) Field of Classification Search
None
See application file for complete search history.

(56) References Cited

U.S. PATENT DOCUMENTS 10,104,417 B2 * 10/2018 Maria .............. H04N 21/64784
2002/0049703 A1    4/2002 Uozumi
(Continued)

FOREIGN PATENT DOCUMENTS

JP    2002-41955    2/2002
JP    2004-102475   4/2004
(Continued)

OTHER PUBLICATIONS

International Search Report and Written Opinion for International Application No. PCT/JP2020/046828 dated Mar. 23, 2021, 10 pages.

*Primary Examiner* — Omar S Parra
(74) *Attorney, Agent, or Firm* — Amin, Turocy & Watson, LLP

(57) ABSTRACT

A server includes: a video data acquiring unit configured to acquire video data in which a game is imaged; a storage configured to store the video data; an image determining unit configured to determine whether or not target image data, which is data of a target image indicating an advertisement client, is included in the stored video data; an advertisement setting unit configured to generate, when the target image data is included in the video data, advertisement setting data at a time when video based on the video data is displayed in an external display, the advertisement setting data being to be used for displaying, in the external display, an advertisement of the advertisement client corresponding to the target image; and a communication unit configured to be capable of sending the video data and the advertisement setting data to outside.

8 Claims, 22 Drawing Sheets

(56) References Cited

U.S. PATENT DOCUMENTS

2013/0132194 A1    5/2013   Rajaram
2019/0075340 A1    3/2019   Hochart
2019/0349643 A1   11/2019   Hall

FOREIGN PATENT DOCUMENTS

| | | |
|---|---|---|
| JP | 2007-201593 | 8/2007 |
| JP | 2011-193326 | 9/2011 |
| JP | 2015-509221 | 3/2015 |

* cited by examiner

| TAG INFORMATION 63b (63) | SCORE DATA 64 | PROCESSING TIMING DATA 65 |
|---|---|---|
| TAG 11 | SCORE 1 | TIMING 11 |
| TAG 12 | SCORE 2 | TIMING 12 |
| TAG 13 | SCORE 3 | TIMING 13 |
| TAG 14 | SCORE 4 | TIMING 14 |
| TAG 15 | SCORE 5 | TIMING 15 |
| TAG 16 | SCORE 6 | TIMING 16 |
| TAG 17 | SCORE 7 | TIMING 17 |
| TAG 18 | SCORE 8 | TIMING 18 |
| ⋮ | ⋮ | ⋮ |

FIG.4

| ADVERTISEMENT CLIENT | TARGET IMAGE | ADVERTISEMENT CONTENT | DISPLAY FORM |
|---|---|---|---|
| CLIENT 1 | ○×∗ | COUPON | DISPLAY 1 |
| CLIENT 2 | △△ COMPANY | COUPON | DISPLAY 2 |
| ⋮ | ⋮ | ⋮ | ⋮ |
| CLIENT n | LOGO DATA n, CHARACTER DATA n | PRODUCT INTRODUCTION | NON-DISPLAY |
| ⋮ | ⋮ | ⋮ | ⋮ |

FIG.10

| INPUT ID | INPUT PERSON ID | INPUT CONTENT | TAG INFORMATION |
|---|---|---|---|
| C054 | 999 | BOTTOM OF 8TH, BATTER 007, SINGLE TO CENTER | TAG 21 |
| C055 | 052 | ○○○ | TAG 22 |
| C056 | 017 | △△△ | TAG 23 |
| C057 | 038 | ×× × | TAG 24 |
| C058 | 999 | BOTTOM OF 8TH, BATTER 008, STRIKE OUT | TAG 25 |
| C059 | 052 | □□□ | TAG 26 |
| C060 | 038 | ○△○ | TAG 27 |
| C061 | 017 | △□× | TAG 28 |
| ⋮ | ⋮ | ⋮ | ⋮ |

| ADVERTISEMENT CLIENT (71) | TARGET IMAGE (72) | ADVERTISEMENT CONTENT (373) | | | DISPLAY FORM (74) |
|---|---|---|---|---|---|
| | | ATTRIBUTE A | ATTRIBUTE B | ... | |
| CLIENT 1 | ○∗∗ | ADVERTISEMENT A1 | ADVERTISEMENT B1 | ... | DISPLAY 1 |
| CLIENT 2 | △△ COMPANY | ADVERTISEMENT A2 | ADVERTISEMENT B2 | ... | DISPLAY 2 |
| ... | ... | ... | ... | ... | ... |
| CLIENT n | LOGO DATA n, CHARACTER DATA n | ADVERTISEMENT An | ADVERTISEMENT Bn | ... | NON-DISPLAY |
| ... | ... | ... | ... | ... | ... |

| DETERMINATION SUBJECT 75 | TARGET IMAGE 72 | ADVERTISEMENT CONTENT 73 | DISPLAY FORM 74 | TYPE 76 | CORRESPONDING CLIENT 77 |
|---|---|---|---|---|---|
| SUBJECT 1 | ○×* | COUPON | DISPLAY 1 | ADVERTISEMENT CLIENT | - |
| SUBJECT 2 | △△ COMPANY | - | - | NON-CLIENT | SUBJECT n |
| ... | ... | ... | ... | ... | ... |
| SUBJECT n | ○○ COMPANY | PRODUCT n | DISPLAY n | ADVERTISEMENT CLIENT | - |
| ... | ... | ... | ... | ... | ... |

470

39

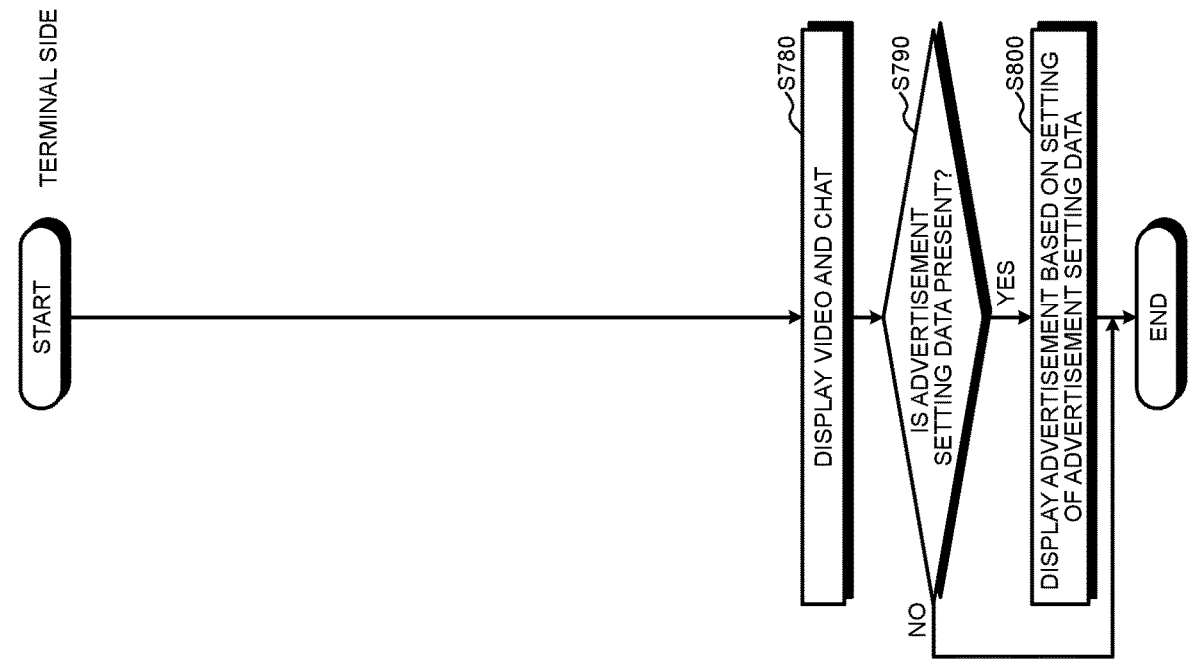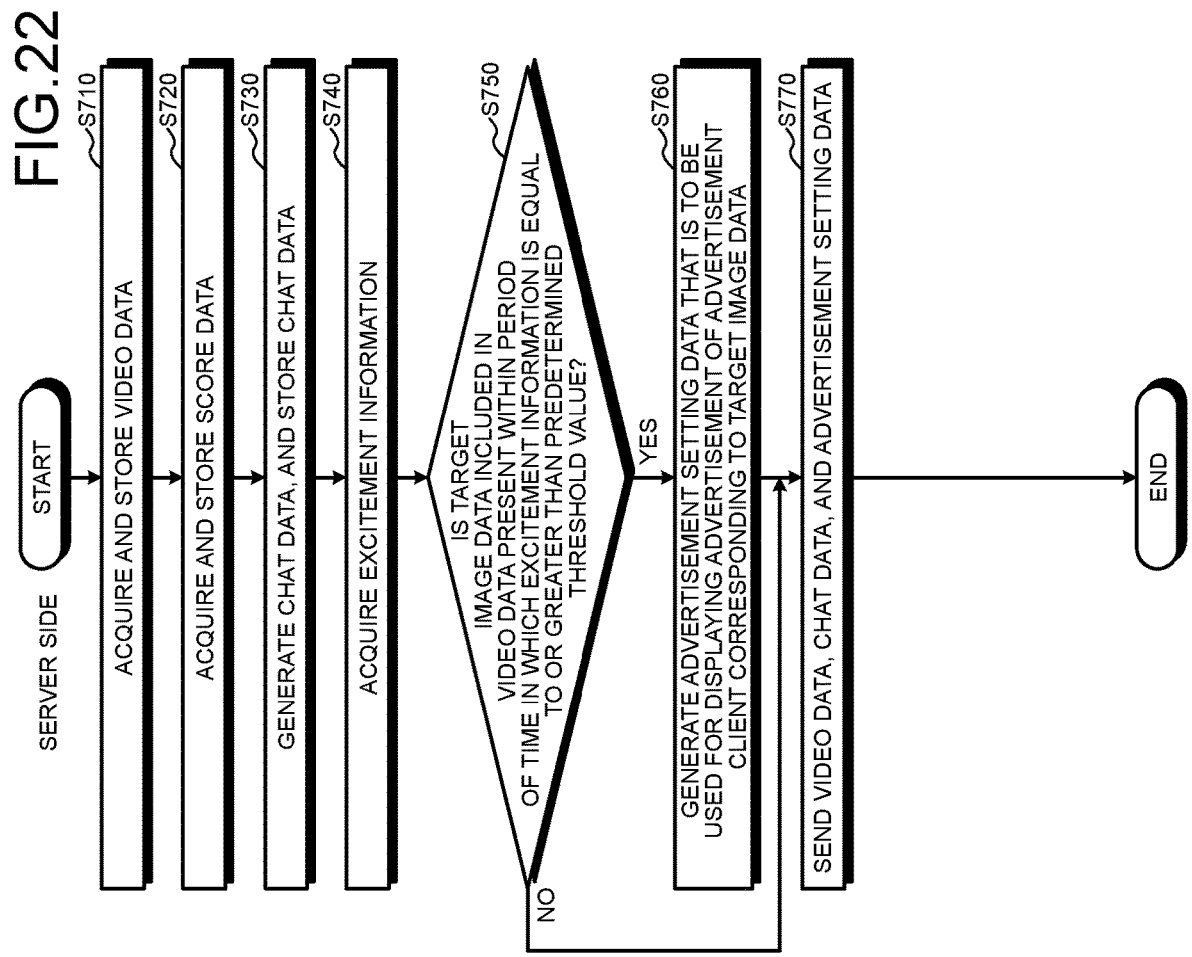

SERVER, AND ADVERTISEMENT SETTING METHOD

CROSS-REFERENCE TO RELATED APPLICATIONS

This application is a Continuation of PCT International Application No. PCT/JP2020/046828 filed on Dec. 15, 2020 which claims the benefit of priority from Japanese Patent Application No. 2020-036177 filed on Mar. 3, 2020, the entire contents of both of which are incorporated herein by reference.

FIELD

The present application relates to a server, and an advertisement setting method.

BACKGROUND

During a game such as a sporting event, sometimes a game situation is understood by watching a video of the game in a handheld device using, for example, a social networking service (SNS). When a game such as a sporting event takes place, not only players act in a group, but sometimes supporters of the players also act in a group. For example, after the game is over, there are cases when the players or the supporters hold a gathering such as a dinner. In such a case, it is beneficial to send advertisements related to a restaurant or a meeting room at which the gathering is going to be held. In Japanese Translation of PCT International Application Publication No. 2015-509221, a method is disclosed for sending advertisements based on information of communication performed using the social networking service.

In Japanese Translation of PCT International Application Publication No. 2015-509221, advertisements are delivered based on information extracted from free exchange of communication among users. However, it is not always true that information useful for a delivery of the advertisement is obtained. Hence, in order to deliver the advertisements, it is required to obtain more useful information.

SUMMARY

A server, and an advertisement setting method are disclosed.

According to one aspect, there is provided a server comprising: a video data acquiring unit configured to acquire video data in which a game is imaged; a storage configured to store the video data; an image determining unit configured to determine whether or not target image data, which is data of a target image indicating an advertisement client, is included in the stored video data; an advertisement setting unit configured to generate, when the target image data is included in the video data, advertisement setting data at a time when video based on the video data is displayed in an external display, the advertisement setting data being to be used for displaying, in the external display, an advertisement of the advertisement client corresponding to the target image; and a communication unit configured to be capable of sending the video data and the advertisement setting data to outside.

According to one aspect, there is provided a server comprising: a video data acquiring unit configured to acquire video data in which a game is imaged; a chat data processing unit configured to be capable of at least one of acquiring chat data related to the game and generating chat data related to the game; a storage configured to store the video data and the chat data; an image determining unit configured to determine whether or not target video data, which is data of a target image indicating a subject to be determined including an advertisement client, is included in the stored video data; an advertisement setting unit configured to generate, when the target image data is included in the video data and when the subject to be determined corresponding to the target image is a non-client different from the advertisement client, advertisement setting data at a time when video based on the video data and chat based on the chat data are displayed in an external display, the advertisement setting data being to be used for displaying, in the external display, an advertisement of a predetermined advertisement client corresponding to the non-client; and a communication unit configured to be capable of sending the video data, the chat data, and the advertisement setting data to outside.

According to one aspect, there is provided an advertisement setting method comprising: acquiring video data in which a game is imaged; acquiring game situation data of the game; storing the video data and the game situation data; determining whether or not target video data, which is data of a target image indicating an advertisement client, is included in the stored video data; generating, when the target image data is included in the video data, advertisement setting data at time when video based on the video data is displayed in an external display, the advertisement setting data being to be used for displaying, in the external display, an advertisement of the advertisement client corresponding to the target image; and sending the video data, the game situation data, and the advertisement setting data to outside.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 3 is a diagram illustrating an example of score data stored in the storage;

FIG. 4 is a diagram illustrating an example of advertisement setting data stored in the storage;

FIG. 10 is a diagram illustrating an example of chat data stored in the storage;

FIG. 16 is a diagram illustrating an example of the advertisement setting data stored in the storage;

FIG. 18 is a diagram illustrating an example of the advertisement setting data stored in the storage;

FIG. 22 is a flowchart for explaining an example of a chat display method according to the sixth embodiment.

DETAILED DESCRIPTION OF THE PREFERRED EMBODIMENTS

Exemplary embodiments of the application concerned are described below with reference to the accompanying drawings. However, the present invention is not limited by the embodiments described below. Moreover, the constituent elements according to the embodiments described below include constituent elements that are easily replaceable for a person skilled in the art, or include practically identical constituent elements.

First Embodiment

Figure 1:
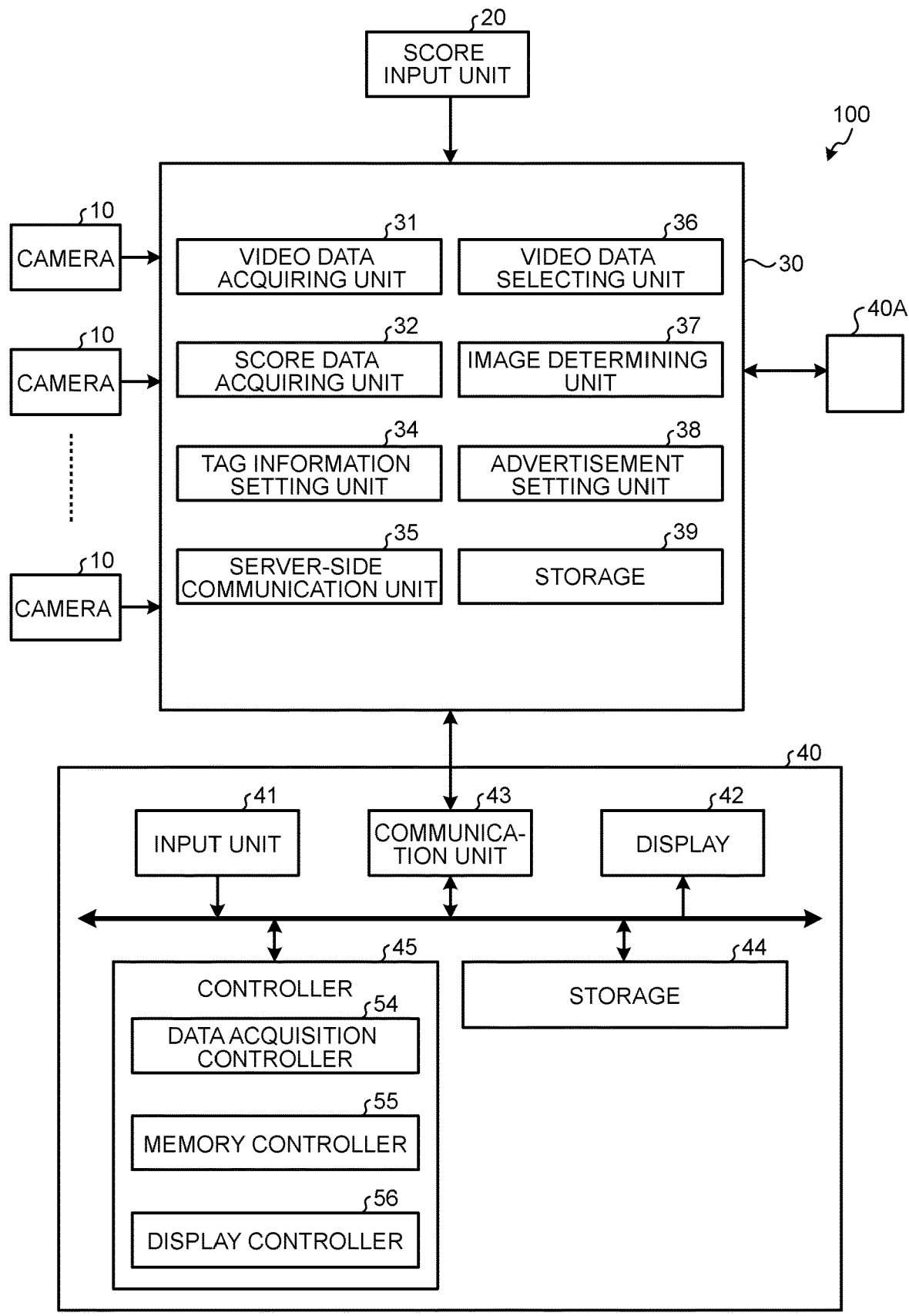
FIG. 1 is a block diagram illustrating an example of a game display system according to a first embodiment.

FIG. 1 is a block diagram illustrating an example of a game display system 100 according to a first embodiment. The game display system 100 illustrated in FIG. 1 is used at a time of watching a game content of a sporting event, such as a baseball game, in a handheld device. As a result of using the game display system 100, for example, even if it is not possible for a person to participate in the game or actually watch it, the person can still understand a game situation. In the following explanation, although a baseball game is given as an example of the sporting event, the game is not limited thereto. Thus, the same explanation is applicable to other sporting events such as soccer, volleyball, tennis, and badminton. Moreover, the game display system 100 can also be implemented for other types of competitions other than a sporting event, such as a dancing event (dance competition), a piano competition (musical competition), a Japanese cards event (a cards competition or a table game competition), a karaoke competition (singing competition).

As illustrated in FIG. 1, the game display system 100 includes cameras 10, a score input unit 20, a server 30, and terminal devices 40 and 40A. The cameras 10 are used to capture, for example, a game content at a game venue. Video data captured by the cameras 10 is sent to, for example, the server 30 and is managed therein. Herein, multiple cameras 10 are installed. However, it is also possible to have a single camera. Moreover, as long as the cameras 10 are capable of capturing video data, it serves the purpose. Thus, it is also possible to use cameras provided in a mobile phone or a smartphone. When the video data is captured by the cameras 10, the data indicating a capture timing is included in the video data.

The score input unit 20 inputs game situation data indicating a situation of a game to the server 30. In the first embodiment, as an example of the game situation data indicating the situation of a baseball game, score data can be cited. The score data is data which constitutes a score written in a baseball scorebook, and contains individual events constituting a series of events started by a pitch thrown by a pitcher. The score represents a collection of sets of score data. Thus, every time a pitcher throws a pitch, multiple sets of the score data are created; and in turn a single score is created. For example, if the next at-bat when a runner is present at first base results in a fly out in the right field, and the first-base runner also gets tagged out, then the following sets of score data are created: score data indicating that the batter is out; score data indicating a fly to right; and score data indicating that the first-base runner is out. Then, those sets of score data constitute a single piece of score.

Other than the score data mentioned above as an example, a score can also include sets of score data such as an action taken by the batter, an action taken by a position player, a confirmation of the count, a base advancement situation of present baserunners, and other actions of the batter or the position players. More particularly, the score can include the score data indicating a strike count, a ball count, a foul count, a batting result, a type of the batted ball, a position player who caught the ball, and a base advancement result. The batting result represents information indicating an out, a single, a double, a triple, or a homerun. The type of the batted ball represents information indicating a ground ball, a line drive, a fly, or a bunt; and can be classified to a more minute level. The position player who caught the ball represents information for identifying the position player who actually caught the ball or identifying the defensive position thereof. The base advancement result represents information related to the base advancement of runners on base, such as "from first base to second base", and can also include other actions taken by the batter or the position players.

As the score input unit 20, for example, an application can be used that inputs the score data described above as electronic data to the server 30. In that case, the score input unit 20 can be installed in a processing device such as a personal computer provided outside the server 30. Alternatively, the score input unit 20 can be installed in the server 30. Meanwhile, in the first embodiment, it is not required to have the score input unit 20 installed.

The server 30 integratedly manages the game display system 100. The server 30 includes various applications, data, and computer programs for managing the game display system 100. As the server 30, for example, a personal computer or a work station is used. However, that is not the only possible case.

In the server 30, multiple groups are set. The chat groups are individually set for each sport, or for each game, or for each team. For each of the chat groups, the server 30 performs various operations as explained below.

The server 30 includes a video data acquiring unit 31, a score data acquiring unit (a game situation data acquiring unit) 32, a tag information setting unit 34, a server-side communication unit 35, a video data selecting unit 36, an image determining unit 37, an advertisement setting unit 38, and a storage 39.

The video data acquiring unit 31 acquires video data that is captured by the multiple cameras 10. The video data acquiring unit 31 stores the acquired video data in the storage 39. The score data acquiring unit 32 acquires, as game situation data, the score data input from the score input unit 20. Moreover, the score data acquiring unit 32 stores, in the storage 39, each set of the score data in a corresponding manner to an input timing thereof.

As a result of storing the video data and the score data, the data gets uploaded in the server 30. At the time of storing the video data and the score data, the server 30 can get the data of the storage timing (hereinafter, referred to as the upload timing) included in each set of the data. That is, the video data and the score data uploaded in the server 30 includes the data of the respective upload timings. The server 30 includes a management application that manages the video data and the score data.

The tag information setting unit 34 sets tag information to each of multiple sets of the video data acquired by the video data acquiring unit 31, and to each of multiple sets of the score data acquired by the score data acquiring unit 32. The tag information contains information related to a tag range. The tag range set with respect to the video data represents a time range corresponding to the timing of capturing the video data. The tag range set with respect to the score data represents a time range corresponding to the input timing of the score data. Herein, the setting is such that the tag range set with respect to the score data includes, for example, a scene in which the situation corresponding to that score data occurs during the game. The input timing of the score data is a timing after a result of the corresponding at-bat in the game is confirmed. In that case, the tag range can be set to a time range in which, for example, the input timing of the score data can be treated as an end timing, and a timing before a predetermined period of time from the input timing can be treated as a start timing.

The server-side communication unit 35 is capable of communicating with the terminal device 40. For example, the server-side communication unit 35 can send the video data and the score data stored in the storage 39, and can send advertisement setting data (explained later).

The video data selecting unit 36 selects a predetermined range of video data from the video data stored in the storage 39, and sends the selected video data to the terminal device 40 via the server-side communication unit 35. For example, when a particular set of the score data is specified in the terminal device 40, the tag range corresponding to the specified score data is detected. Then, the video data selecting unit 36 sends the video data corresponding to the timing set in the tag range to the terminal device 40 via the server-side communication unit 35.

The image determining unit 37 determines whether or not target image data, which represents data of a target image indicating an advertisement client, is included in the video data. The advertisement client is an entity that requests an administrator of the server 30 to display advertisements at a time of displaying the video based on the video data. The advertisement includes a variety of content such as an introduction of the advertisement client, an introduction of a product or a service, or provision of gifts such as coupons. The target image includes an image of the emblem (a character, a graphic, a symbol, a stereoscopic shape, a color, or a combination thereof) indicating the advertisement client. The target images serving as the determination criteria can be stored in advance in the storage 39. That is, the image determining unit 37 compares the target image data, which is stored in the storage 39, with the video data; and performs an image-processing-based determination about whether or not the target image data is included in the video data.

The advertisement setting unit 38 sets a display form of the advertisement at the time when the video based on the video data is displayed in an external display. In the first embodiment, the advertisement setting unit 38 performs setting in such a way that, when the target image data of the advertisement client is included in the video data, at the time when the video based on the video data is displayed in the external display, the advertisement corresponding to the target image is also displayed in the display. In that case, the advertisement setting unit 38 can perform setting in such a way that, while the target image is being displayed in the display, the advertisement is also displayed in the display. Moreover, the advertisement setting unit 38 can perform setting in such a way that the target image and the advertisement is displayed in a corresponding manner to each other in the display. Furthermore, the advertisement setting unit 38 can perform setting in such a way that the advertisement of the advertisement client corresponding to the target image data which is not included in the video data is not displayed.

Moreover, the advertisement setting unit 38 can change the display form of the advertisement according to at least one of a duration of the display of the target image and the number of scenes in which the target image is displayed. For example, the advertisement setting unit 38 can change the display content of the advertisement according to the duration of the display of the target image and the number of the scenes of the target image. Moreover, the advertisement setting unit 38 can change the duration of the display of the advertisement according to the duration of the display of the target image and the number of the scenes of the target image. Meanwhile, the details about changing the display form of the advertisement is not limited to the explanation described above, and other display forms can be changed too.

The storage 39 is used to store multiple sets of the video data acquired by the video data acquiring unit 31, and to store the score data acquired by the score data acquiring unit 32. The video data contains data indicating the video of a game in which the game is imaged. Moreover, the video data contains data indicating a capture timing at which the video of the game is imaged. Meanwhile, the storage 39 is used to store the target image data of the advertisement client.

Figure 2:
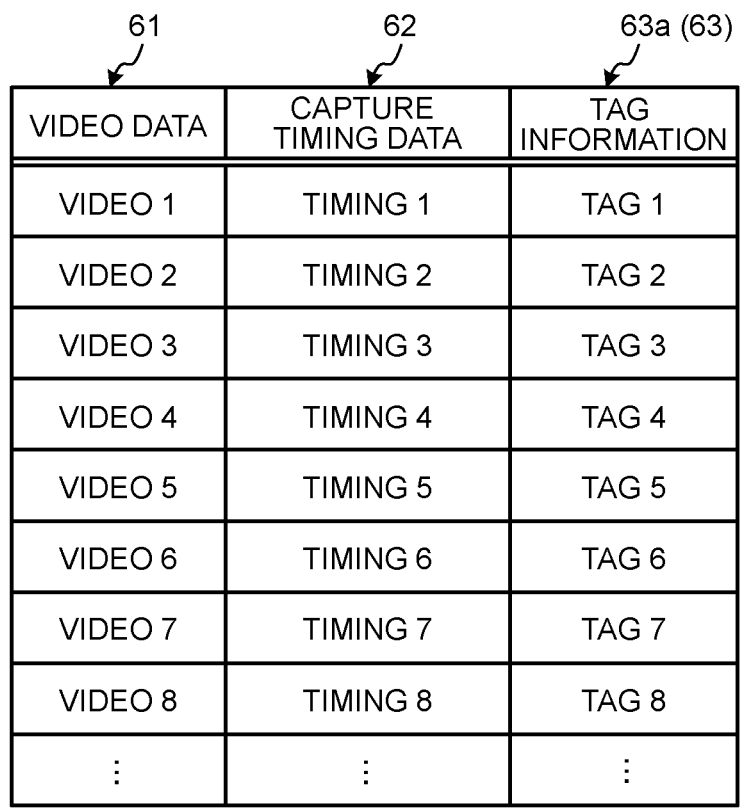
FIG. 2 is a diagram illustrating an example of video data stored in a storage.

FIG. 2 is a diagram illustrating an example of video data stored in the storage 39. As illustrated in FIG. 2, video data 61 is stored in the storage 39 in a corresponding manner to capture timing data 62 and tag information 63*a*.

FIG. 3 is a diagram illustrating an example of score data stored in the storage 39. As illustrated in FIG. 3, score data 64 is stored in the storage 39 in a corresponding manner to processing timing data 65 and tag information 63*b*. The processing timing data 65 represents information associated to the tag information 63*b*, and indicates a processing timing of the corresponding score data. The processing timing of the score data can be set to, for example, the upload timing at which the score data is uploaded to the server 30.

The tag information 63 (the tag information 63*a* and 63*b*) illustrated in FIGS. 2 and 3 represents information for associating the video data 61 and the score data 64. According to the tag information 63*a* and the tag information 63*b*, the video data 61 and the score data 64 are stored in the storage 39 in a corresponding manner to each other based on the capture timings and the processing timings.

FIG. 4 is a diagram illustrating an example of advertisement setting data stored in the storage 39. Herein, advertisement setting data 70 contains client data 71, target image data 72, advertisement content data 73, and display form data 74. The client data 71 indicates the advertisement client. The target image data 72 indicates content of the target image. The advertisement content data 73 indicates an advertisement content. The display form data 74 indicates the display form such as a display start timing, a display end timing, and a display position in the display. Each of the display forms is, for example, set in advance. Moreover, the display form data 74 represents a setting about whether or not to perform display in the display. That is, regarding the advertisement for which the image determining unit 37 determines that the target image data is not included and for which the advertisement setting unit 38 has performed setting for non-display, even if the display form is set in advance, the setting is overwritten to non-display.

Meanwhile, the storage 39 is used to store an advertisement setting program that causes a computer to perform following operations: an operation for acquiring the video data in which a game is imaged; an operation for acquiring the game situation data of the game; an operation for storing the video data and the game situation data; an operation for determining whether or not the target image data, which represents the data of the target image indicating the advertisement client, is included in the stored video data; an operation for generating, when the target image data is included in the video data, advertisement setting data at the time when the video based on the video data is displayed in the external display, the advertisement setting data being to be used for displaying, in the external display, the advertisement of the advertisement client corresponding to the target image; and an operation for sending the video data, the game situation data, and the advertisement setting data to the outside thereof.

The terminal devices 40 and 40A respectively include an input unit 41, a display 42, a communication unit 43, a storage 44, and a controller 45. The input unit 41, the display 42, the communication unit 43, the storage 44, and the controller 45 are connected to each other via, for example, a bus line. Examples of the terminal device 40 include portable information terminals such as a cellular phone, a smartphone, a tablet, and a notebook personal computer.

The input unit 41 enables predetermined input operations for inputting information. According to each input operation, the input unit 41 outputs an instruction signal to the controller 45. As the input unit 41, an input device such as a touch-sensitive panel is used. Meanwhile, as the input unit 41, in place of or in addition to using the touch-sensitive panel, it is also possible to use buttons, levers, a dial, switches, or some other input devices. The input unit 41 outputs an instruction signal according to a predetermined input operation. The display 42 displays a variety of information containing characters and images. The display 42 includes a display panel such as a liquid crystal panel. The display 42 is capable of displaying information including videos.

Figure 5:
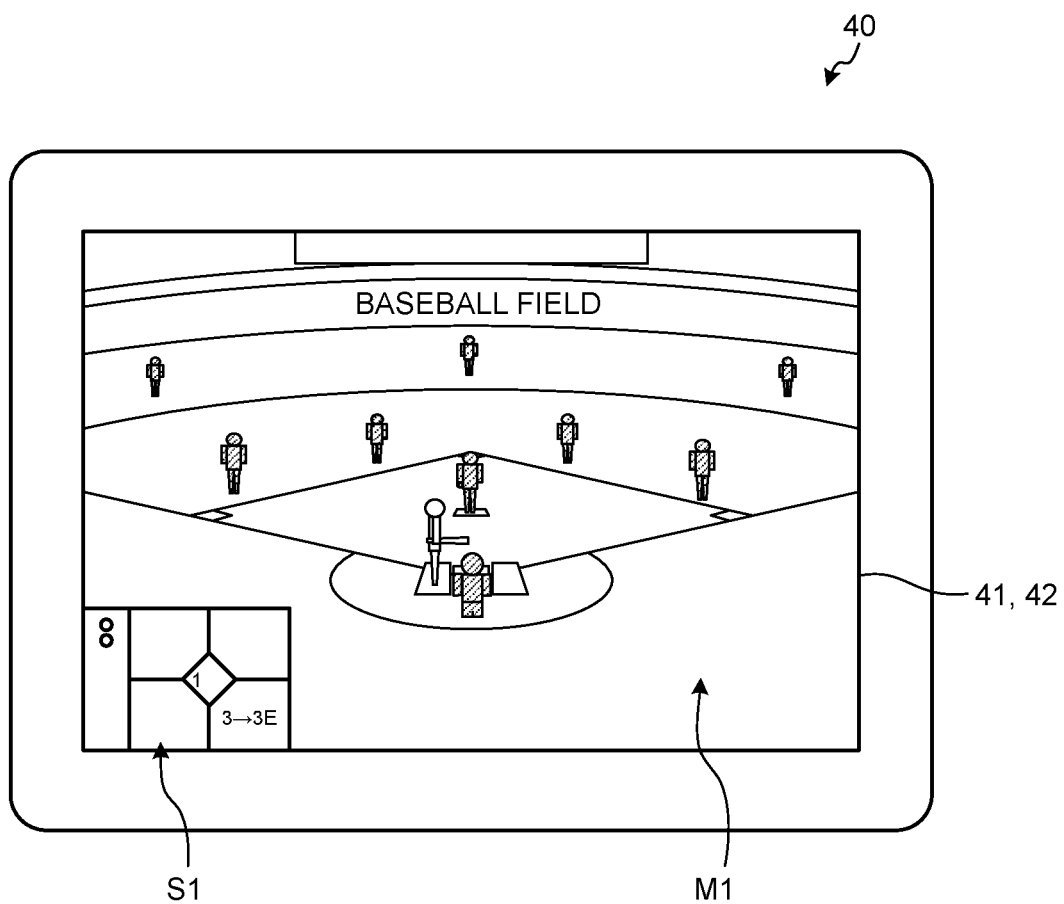
FIG. 5 is a diagram illustrating an example of an input unit and a display of a terminal device.

FIG. 5 is a diagram illustrating an example of the input unit 41 and the display 42 of the terminal device 40 according to the first embodiment. As illustrated in FIG. 5, the terminal device 40 includes, for example, the input unit 41 of the touch-sensitive panel type and the display 42. That is, a touch-sensitive panel as the input unit 41 is disposed in an overlapping manner on a display panel as the display 42.

In the display 42, for example, a video display region M1 and a score display region S1 are displayed. In the video display region M1, the video based on the video data is displayed. Moreover, in the video display region M1, a scrollbar can be displayed for enabling a specification of a playback timing of the video. In the score display region S1, the score based on the score data is displayed. The score displayed in the score display region S1 is not limited to the form illustrated in FIG. 5. Alternatively, the score can be displayed in some other form such as content of the scoreboard.

When an operation such as a touch operation or a scroll operation is performed with respect to a predetermined region on the surface of the touch-sensitive panel, the input unit 41 outputs a predetermined instruction signal that includes the position information of the operated region and the operation details. The position information is set, for example, in a corresponding manner to the position of the display 42. Meanwhile, the configurations of the input unit 41 and the display 42 are not limited to the configuration explained above.

The communication unit 43 communicates information with external devices in a wired manner or a wireless manner. For example, the communication unit 43 communicates the video data and the score data with the external server 30.

The storage 44 includes a storage such as a hard disk drive or a solid state drive. Alternatively, as the storage 44, it is possible to use an external memory medium such as a removable disk. The storage 44 is used to store the operating system of the terminal device 40, and to store various computer programs and data for controlling the operations of the input unit 41, the display 42, and the communication unit 43. For example, the storage 44 can be used to store frame data of the video display region M1 and the score display region S1 that are displayed in the display 42.

The controller 45 controls the input unit 41, the display 42, and the communication unit 43. Moreover, the controller 45 performs an arithmetic processing and operations according to the instruction signals received from the input unit 41. The controller 45 includes a processing device such as a central processing unit (CPU), and includes memory devices such as a random access memory (RAM) or a read only memory (ROM). The controller 45 includes a data acquisition controller 54, a storage controller 55, and a display controller 56.

The data acquisition controller 54 accesses the server 30 via the communication unit 43, and acquires the video data and the score data stored in the storage 39 of the server 30.

The display controller 56 controls the display content displayed in the display 42. Herein, based on the video data and the score data acquired via the communication unit 43, the display controller 56 controls the display content of the video display region M1 and the display content of the score display region S1. Moreover, when a scrollbar for enabling a specification of a playback timing of the video is displayed in the video display region M1, the display controller 56 displays, in the video display region M1, the video data starting from the playback timing specified using the scrollbar.

Moreover, in the first embodiment, when one of the score displayed in the score display region S1 is specified using the input unit 41, the display controller 56 sends information indicating that the one score is specified. In that case, in the server 30, as explained earlier, the video data selecting unit 36 selects the video data corresponding to the specified score, and the selected video data is sent to the terminal device 40. In the terminal device 40, the communication unit 43 receives the video data. Then, the display controller 56 can display, in the video display region M1, the video based on the received video data.

Figure 6:
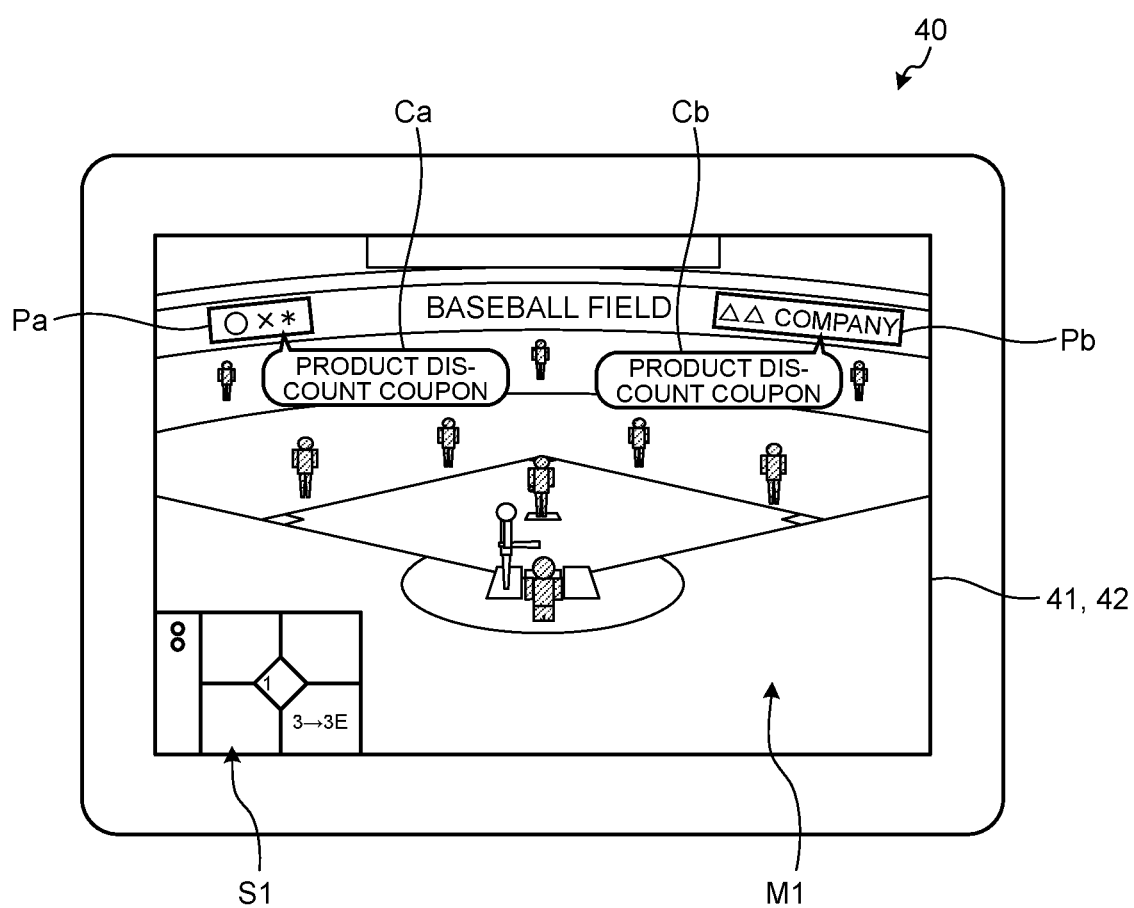
FIG. 6 is a diagram illustrating an example of a display content displayed in a display of the terminal device.

Moreover, based on the received advertisement setting data, the display controller 56 displays the advertisement in the display 42. FIG. 6 is a diagram illustrating an example of the display content displayed in the display 42 of the terminal device 40. If the target image data is included in the video data, then, as a result of the control performed by the display controller 56, target images Pa and Pb based on the target image data are displayed in the display 42. The target images Pa and Pb are images of the emblems indicating the advertisement clients. When the target images Pa and Pb are displayed, based on the advertisement setting data, the display controller 56 displays, for example, advertisements Ca and Cb of the advertisement clients in the display 42 in a corresponding manner to the target images Pa and Pb, respectively.

As illustrated in FIG. 6, the display controller 56 can display the advertisements Ca and Cb in a corresponding manner to the target images Pa and Pb, respectively. For example, the display controller 56 displays the advertisement Ca in a word balloon originating from the target image Pa, and displays the advertisement Cb in a word balloon originating from the target image Pb. Hence, the target images Pa and Pb can be directly associated to the advertisements Ca and Cb, respectively.

Figure 7:
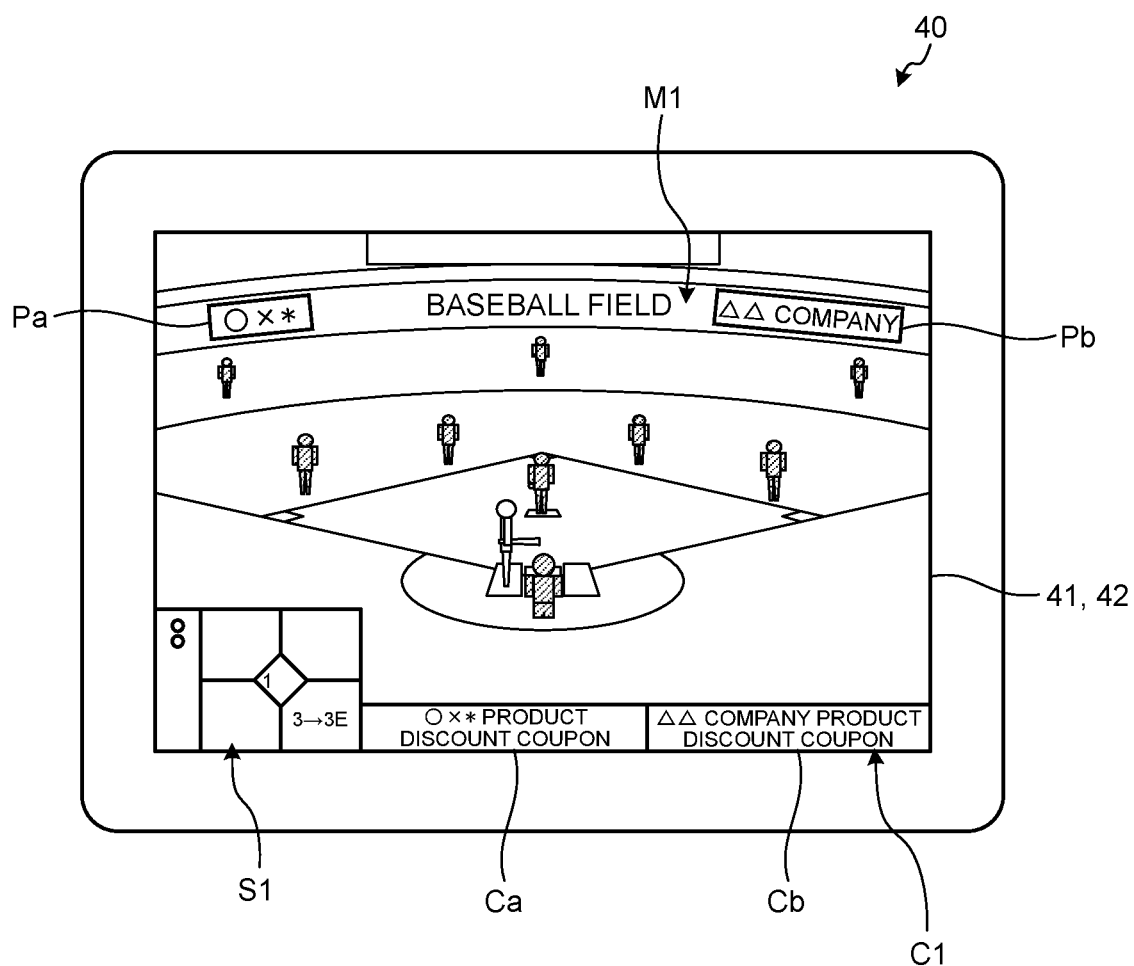
FIG. 7 is a diagram illustrating another example of the display content displayed in the display of the terminal device.

FIG. 7 is a diagram illustrating another example of the display content displayed in the display 42 of the terminal device 40. As illustrated in FIG. 7, the display controller 56 can display the advertisements Ca and Cb without directly associating them with the target images Pa and Pb, respectively. For example, the display controller 56 can provide an advertisement display region C1 in some part of the display 42, and can display the advertisements Ca and Cb in the advertisement display region C1.

Based on the setting of the video data, the display controller 56 can display, in the display 42, the advertisements Ca and Cb during a period of time in which the target images Pa and Pb are displayed in the display 42. In that case, the display controller 56 can start the display of the advertisements Ca and Cb at the timing corresponding to the start of the display of the target images Pa and Pb. The timing corresponding to the start of the display either can be the same timing as the start of the display of the target images Pa and Pb or can be a timing after a predetermined period of time from the start of display elapses. Moreover, the display controller 56 can end the display of the advertisements Ca and Cb at the timing corresponding to the end of the display of the target images Pa and Pb. The timing corresponding to the end of display either can be the same timing as the end of the display or can be a timing after a predetermined period of time from the end of display elapses. Thus, even after the display of the target images Pa and Pb is ended, the display controller 56 can keep on displaying the advertisements Ca and Cb. The display controller 56 can set a duration of the display of the advertisements Ca and Cb according to the duration of the display of the target images Pa and Pb and according to the number of scenes in which the target images Pa and Pb are displayed.

Moreover, at the time of displaying the advertisements Ca and Cb, the display controller 56 can highlight the target images Pa and Pb.

Figure 8:
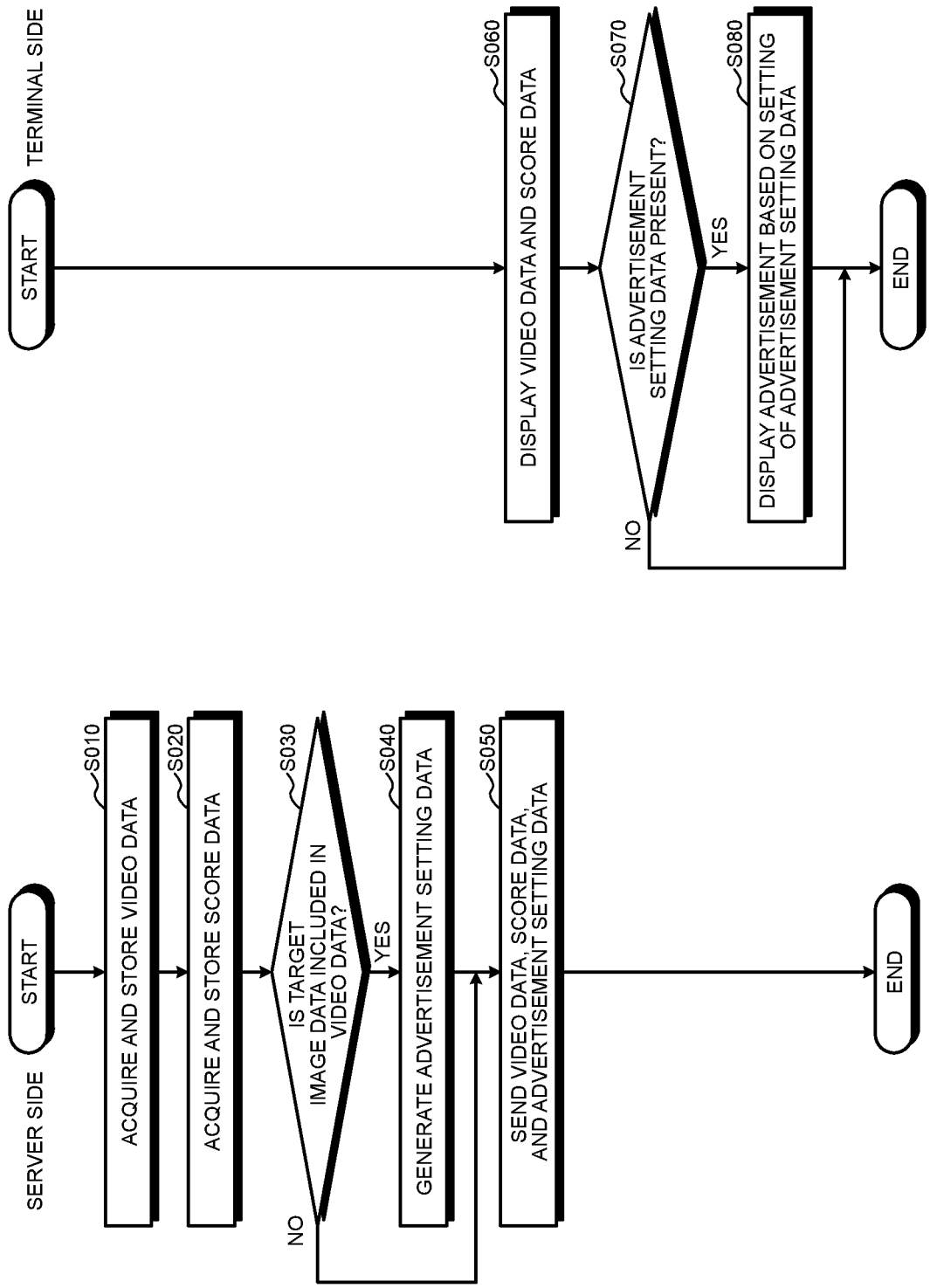
FIG. 8 is a flowchart for explaining an example of an advertisement setting method according to the first embodiment.

Given below is an explanation of the operations performed in the game display system 100 configured in the manner explained above. FIG. 8 is a flowchart for explaining an example of an advertisement setting method according to the first embodiment. In FIG. 8, regarding the operations performed in the server 30 and the operations performed in the terminal device 40, separate flowcharts are illustrated.

As illustrated in FIG. 8, in the server 30, the video data acquiring unit 31 acquires the video data input from the cameras 10, and stores it in the storage 39 (Step S010). The score data acquiring unit 32 acquires the score data input from the score input unit 20, and stores it in the storage 39 (Step S020). When the video data and the score data are acquired, the tag information setting unit 34 sets the tag range as the tag information.

The image determining unit 37 determines whether or not the target image data is included in the video data (Step S030). At Step S030, based on the target image data stored in the storage 39, the image determining unit 37 performs an image-processing-based determination about whether or not the target image data is included in the video data. If the image determining unit 37 determines that the target image data is included in the video data (Yes at Step S030), then the advertisement setting unit 38 generates advertisement setting data to be used for displaying, in the display, the advertisement of the advertisement client corresponding to the target image data (Step S040). On the other hand, if the image determining unit 37 determines that the target image data is not included in the video data (No at Step S030), then the advertisement setting unit 38 skips the operation at Step S040. Then, the server-side communication unit 35 sends the video data and the score data, as well as sends the advertisement setting data if it has been generated (Step S050).

In the terminal device 40, a variety of the data sent from the server 30 is received. The display controller 56 displays, in the display 42, the video based on the video data and the score based on the score data (Step S060). Moreover, the display controller 56 determines whether or not the advertisement setting data is present (Step S070). If it is determined that the advertisement setting data is present (Yes at Step S070), then the display controller 56 displays the advertisement based on the setting of the advertisement setting data (Step S080). On the other hand, when it is determined that the advertisement display setting is not available, such as when the advertisement setting data is not received or when the display form data of the advertisement setting data is set to entirely non-display (No at Step S070), the operation at Step S080 is skipped.

As explained above, the game display system 100 according to the first embodiment includes the server 30 that further includes followings: the video data acquiring unit 31 configured to acquire the video data in which a game is imaged; the score data acquiring unit 32 configured to acquire the score data of the game; the storage 39 configured to store the video data and the score data; the image determining unit 37 configured to determine whether or not the target image data, which is the data of the target image indicating the advertisement client, is included in the stored video data; the advertisement setting unit 38 configured to generate, when the target image data is included in the video data, the advertisement setting data at the time when the video based on the video data is displayed in the external display 42, the advertisement setting data being to be used in displaying, in the external display 42, the advertisement of the advertisement client corresponding to the target images; and the server-side communication unit 35 configured to be capable of sending the video data, the score data, and the advertisement setting data to the outside thereof. Moreover, the game display system 100 according to the first embodiment includes the terminal device 40 that further includes followings: the display 42; the communication unit 43 configured to communicate information with the server-side communication unit 35; and the display controller 56 configured to display, in the display 42, the video and the score based on the video data and the score data received by the communication unit 43 and, when the advertisement setting data is received by the communication unit 43, display, in the display 42, the advertisement based on the advertisement setting data.

According to the first embodiment, in the server 30, when the target image data is included in the video data, the advertisement setting data is generated in such a way that the advertisement of the advertisement client corresponding to the target image data is displayed. In the terminal device 40, the advertisement is displayed based on the advertisement setting data. As a result, the advertisement of the advertisement client is displayed that are recognized by the user in the display 42. That enables an advertisement delivery based on information having high effectiveness.

In the game display system 100 according to the first embodiment, the advertisement setting unit 38 performs setting in such a way that, while the target images Pa and Pb are being displayed in the display 42, the advertisements Ca and Cb are also displayed in the display 42. Thus, as a result of displaying the advertisements Ca and Cb at the timing at which the user recognizes the target images Pa and Pb, the real-time display can be impressed upon the user.

In the game display system 100 according to the first embodiment, the advertisement setting unit 38 performs setting in such a way that the target images Pa and Pb are displayed in a corresponding manner to the advertisements Ca and Cb, respectively. As a result, the user can be made aware of the target images Pa and Pb and the advertisements Ca and Cb of the advertisement clients in a corresponding manner.

Second Embodiment

Figure 9:
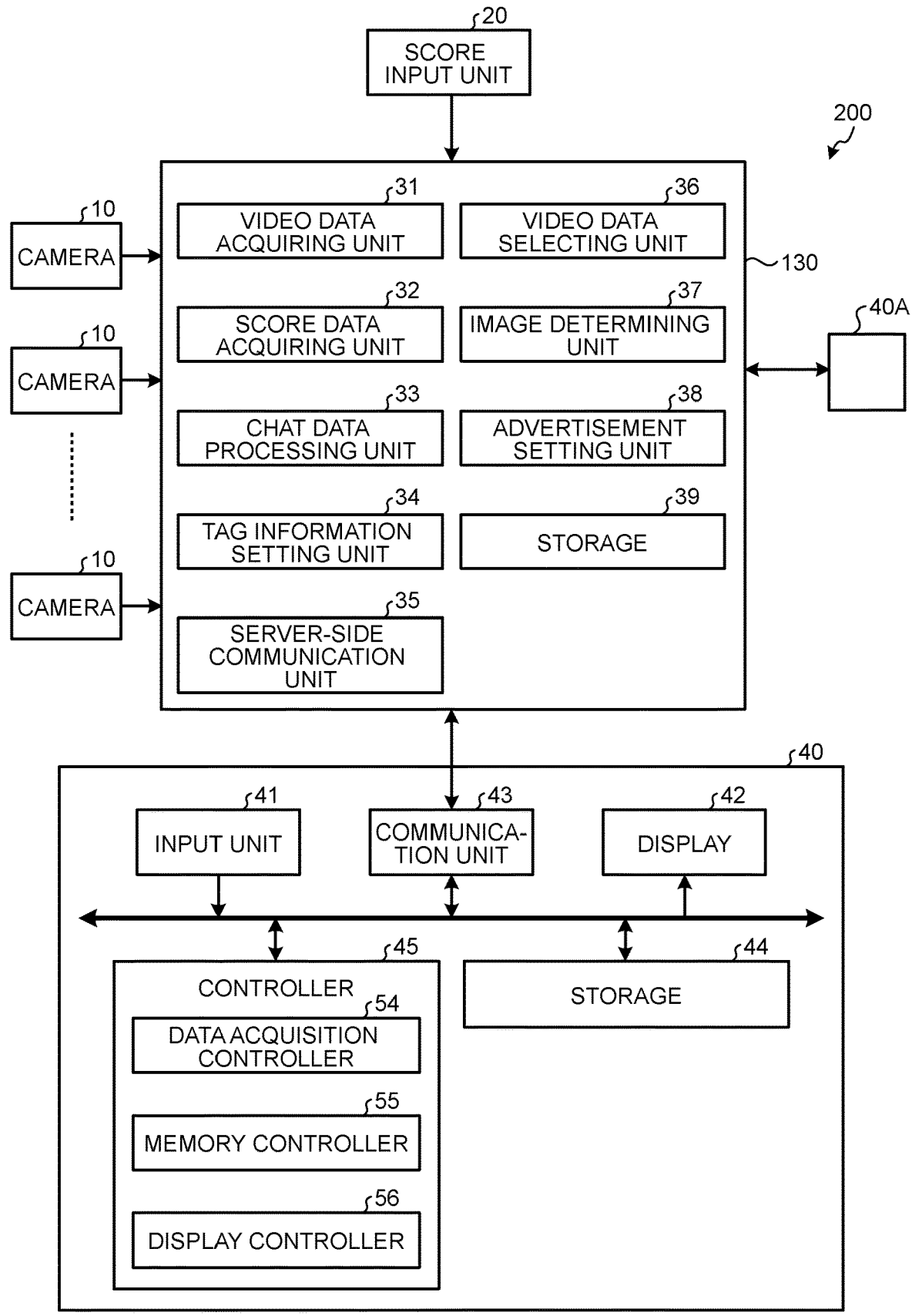
FIG. 9 is a block diagram illustrating an example of a chat system according to a second embodiment.

Given below is an explanation of a second embodiment. FIG. 9 is a block diagram illustrating an example of a chat system 200 according to the second embodiment. The chat system 200 illustrated in FIG. 9 is used for chatting about a game of a sporting event such as baseball. As a result of using the chat system 200, it becomes possible to inform, by chatting, the game situation so that, for example, even if it is not possible for a person to participate in the game or actually watch it, the person can still gain an understanding of the game situation.

As illustrated in FIG. 9, the chat system 200 includes the cameras 10, the score input unit 20, a server 130, and the terminal devices 40 and 40A. The cameras 10, the score input unit 20, and the terminal devices 40 and 40A have an identical configuration to the first embodiment.

The server 130 comprehensively manages the chat system 200. The server 130 includes various applications, data, and computer programs for managing the chat system 200. As the server 130, for example, a personal computer or a work station is used. However, that is not the only possible case.

In the server 130, multiple chat groups are set. The chat groups are individually set for each sport, or for each game, or for each team. For each chat group, the server 130 performs various operations as explained below.

In an identical manner to the first embodiment, the server 130 includes the video data acquiring unit 31, the score data acquiring unit (the game situation data acquiring unit) 32, the tag information setting unit 34, the server-side communication unit 35, the video data selecting unit 36, the image determining unit 37, the advertisement setting unit 38, and the storage 39. Moreover, in the second embodiment, in addition to the configuration explained above, the server 130 includes a chat data processing unit 33.

As a result of storing the video data and the chat data, the data gets uploaded in the server 130. At the time of storing the chat data, the server 130 can include the data of the timing of storing the chat data (hereinafter, referred to as the upload timing) in each set of the chat data. That is, the sets of the chat data uploaded in the server 130 include the data of the respective upload timings. The server 130 includes a management application that manages the video data and the chat data.

The chat data processing unit 33 stores, in the storage 39, the chat data input from the terminal device 40. Moreover, when the score data acquiring unit 32 acquires the score data, the chat data processing unit 33 generates chat data having the content corresponding to the score data. In that case, for example, the chat data processing unit 33 is capable of generating chat data in which the content of the score data is expressed in the form of characters. As a result, every time the score data is updated, the updated score data can be confirmed as the information about the chat.

The tag information setting unit 34 sets tag information with respect to each of multiple sets of the video data acquired by the video data acquiring unit 31 and each of multiple sets of the score data acquired by the score data acquiring unit 32. Moreover, the tag information setting unit 34 sets the tag information with respect to each set of the chat data acquired or generated by the chat data processing unit 33. The tag information contains information related to the tag range. The tag range set for a set of the chat data represents the time range corresponding to the timing of acquiring or generating the chat data.

The server-side communication unit 35 is capable of communicating with the terminal device 40. For example, the server-side communication unit 35 can send the video data, the score data, and the chat data stored in the storage 39, and can send the advertisement setting data.

The video data selecting unit 36 selects a predetermined range of video data from the video data stored in the storage 39, and sends the selected video data to the terminal device 40 via the server-side communication unit 35. For example, when the chat data generated by the chat data processing unit 33 and equivalent to a server message is specified in the terminal device 40, the tag range corresponding to the specified chat data is detected. Then, the video data selecting unit 36 selects the video data from the start timing of the tag range, and sends the video data to the terminal device 40 via the server-side communication unit 35.

In an identical manner to the first embodiment, the image determining unit 37 determines whether or not the target image data, which represents the data of the target image indicating the advertisement client, is included in the video data. For example, the image determining unit 37 compares the target image data, which is stored in the storage 39, with the video data, and performs an image-processing-based determination about whether or not the target image data is included in the video data. Moreover, in the second embodiment, when the user of the terminal device 40 selects a particular team, the image determining unit 37 can determine whether or not the target image data is included in the video data in which the selected team is imaged. In that case, although the image determining unit 37 determines whether or not the target image data is included in the video data for the selected team, it does not determine whether or not the target image data is included in the remaining video data. However, when the user of the terminal device 40 does not select any particular team, for example, the image determining unit 37 can determine whether or not the target image data is included in all of the video data.

The advertisement setting unit 38 sets the display form of the advertisement at the time when the video based on the video data is displayed in the external display. When the target image data of the advertisement client is included in the video data, the advertisement setting unit 38 performs setting in such a way that, at the time when the video based on the video data is displayed in the display, the advertisement corresponding to the target image is also displayed in the display. In the second embodiment, the advertisement setting unit 38 can perform setting in such a way that, when the target image data of the advertisement clients is included in the video data, the video based on the video data is displayed in at least one of a video display region 42a (explained later) or a chat display region 42b (explained later) of the display 42. In that case, the advertisement setting unit 38 can generate the chat data in such a way that the content of the advertisement is included in the chat displayed in the chat display region 42b (hereinafter, referred to as advertisement chat data). The advertisement setting unit 38 stores the advertisement chat data in the storage 39 at a timing based on the advertisement setting data. For example, at the timing at which the target images are displayed in the display 42 of the terminal device 40, the advertisement setting unit 38 generates the advertisement chat data and stores it in the storage 39. As a result, the advertisement chat data is sent to the terminal device 40 via the server-side communication unit 35, and an advertisement chat based on the advertisement chat data is displayed in the chat display region 42b of the display 42 of the terminal device 40. Moreover, in an identical manner to the first embodiment, the advertisement setting unit 38 can perform setting in such a way that, while the target image is being displayed in the display, the advertisement is also displayed in the display. Furthermore, the advertisement setting unit 38 can perform setting in such a way that the target image and the advertisement is displayed in a corresponding manner in the display. Moreover, the advertisement setting unit 38 can perform setting in such a way that the advertisement of the advertisement client corresponding to the target image data which is not included in the video data is not displayed. In the second embodiment, when the user of the terminal device 40 selects a particular team, and if the target image data is included in the video data in which the selected team is imaged, the advertisement setting unit 38 performs control in such a way that, when the video based on the video data for the selected team is displayed in the external display, the advertisement corresponding to the target image is also displayed in the display.

Moreover, the advertisement setting unit 38 can change the display form of the advertisement according to at least one of the duration of the display of the target image and the number of scenes in which the target image is displayed. For example, the advertisement setting unit 38 can change the display content of the advertisement according to the duration of the display of the target image and the display scene count of the target image. Moreover, the advertisement setting unit 38 can change the duration of the display of the advertisement according to the duration of the display of the target image and the display scene count of the target image. Meanwhile, the details about changing the display form of the advertisement is not limited to the explanation described above, and other display forms can be changed too.

The storage 39 is used to store multiple sets of the video data acquired by the video data acquiring unit 31, to store the score data acquired by the score data acquiring unit 32, and to store the chat data acquired or generated by the chat data processing unit 33. The video data contains data indicating the video in which a game is imaged. Moreover, the video data contains data indicating the capture timing at which the video of the game is imaged. Meanwhile, the storage 39 is used to store the target image data of the advertisement clients. Moreover, the storage 39 is used store team data about the team selected by the user of the terminal device 40.

FIG. 10 is a diagram illustrating an example of the chat data stored in the storage 39. As illustrated in FIG. 10, the chat data contains input ID 66, input person ID 67, input content 68, and tag information 63c.

Regarding the input ID 66, every time chat data is input or generated in the server 130, a single input ID 66 is created. The input person ID 67 represents information enabling an identification of a person who input the corresponding chat data. If the chat data is generated in the server 130, then the input person ID 67 can be set to, for example, a predetermined value (for example, "999"). The input content 68 represents information indicating content of a message displayed in the chat display region 42b (explained later) in the terminal device 40. The input content 68 includes, for example, character data or predetermined illustration data. The tag information 63c represents information enabling an identification of the chat data created for each input ID 66. Thus, every time the input ID 66 is created, a single set of tag information 63c is also created. In the tag information 63c, tag numbers are assigned as indexes in ascending order. Meanwhile, the ID numbers of the input ID 66 can also be used as the tag information.

The tag information 63c represents information corresponding to, for example, the tag information 63a illustrated in FIG. 2 and the tag information 63b illustrated in FIG. 3. As a result of associating the tag information 63c to, for example, the tag information 63b, the processing timing of the score data 64 is associated to the chat data. Meanwhile, the tag information 63b can be associated to the upload timing at which the chat data is uploaded in the server 130. According to the tag information 63 (63a, 63b, and 63c), the video data, the score data, and the chat data can be stored in a corresponding manner based on the capture timing and the processing timing (the upload timing).

Meanwhile, the storage 39 is used to store an advertisement setting program that causes a computer to perform following operations: an operation for acquiring the video data in which a game is imaged; an operation for at least one of acquiring the chat data related to the game and generating the chat data related to the game; an operation for storing the video data and the chat data; an operation for determining whether or not the target image data, which represents the data of the target images indicating the advertisement client, is included in the stored video data; an operation for generating, when the target image data is included in the video data, the advertisement setting data at the time when the video based on the video data and the chat based on the chat data are displayed in the external display, the advertisement setting data being to be used for displaying, in the external display, the advertisement of the advertisement client corresponding to the target image; and an operation for sending the video data, the chat data, and the advertisement setting data to the outside thereof.

The terminal devices 40 and 40A respectively include the input unit 41, the display 42, the communication unit 43, the storage 44, and the controller 45. Thus, the terminal devices 40 and 40A have an identical configuration to those of the first embodiment.

Figure 11:
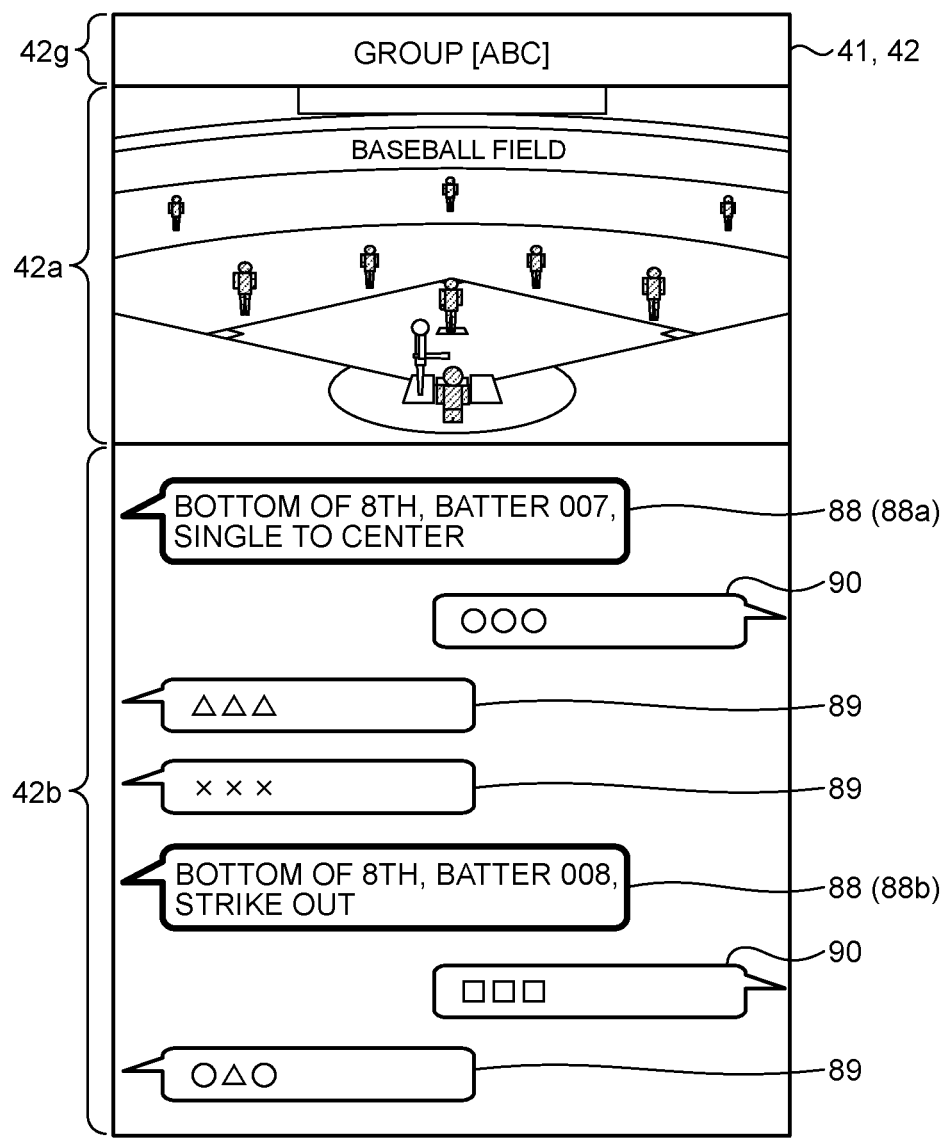
FIG. 11 is a diagram illustrating an example of the input unit and the display of the terminal device.

FIG. 11 is a diagram illustrating an example of the input unit 41 and the display 42 of the terminal device 40 according to the second embodiment. As illustrated in FIG. 11, the terminal device 40 includes, for example, the input unit 41 of the touch-sensitive panel type and the display 42.

That is, a touch-sensitive panel representing the input unit 41 is disposed in an overlapping manner on a display panel representing the display 42. For example, the user of the terminal device 40 can operate the input unit 41 and input the team information regarding a particular team participating in a game. The input team information is stored in the storage 44. Then, the communication unit 43 sends the team information, which is stored in the storage 44, to the server 130.

In the display 42, for example, the video display region 42a, the chat display region 42b, and a group display region 42g are displayed. In the video display region 42a, the video data is displayed. Moreover, in the video display region 42a, a scrollbar can be displayed for enabling a specification of the playback timing of the video data.

In the chat display region 42b, the chat based on the chat data is displayed. For example, in the chat display region 42b, following types of messages are displayed: server messages 88 that are based on the chat data generated in the server 130; other-person messages 89 that are based on the chat data input in the other terminal device 40A different from the terminal device 40; and self messages 90 that are based on the chat data input in the terminal device 40. In the server messages 88, for example, the content of the score data, which is input from the server 130, is illustrated in the form of a text. A server message 88a illustrated in the upper part in FIG. 11 indicates that, for example, a batter 007 hit a single to center in the bottom half of the eighth inning. A server message 88b illustrated in the lower part in FIG. 11 indicates that, for example, a batter 008 struck out in the bottom half of the eighth inning.

The server messages 88 and the other-person messages 89 are displayed in, for example, the left-side region of the chat display region 42b. The self messages 90 are displayed in, for example, the right-side region of the chat display region 42b. The server messages 88 and the other-person messages 89 can be displayed in a distinguishable manner, such as by differing types of frames in which the messages are displayed. As a result, the server messages 88 and the other-person messages 89 can be distinguished from each other. In the group display region 42g, the information is displayed about a group to which the operator of the terminal device 40 belongs. Meanwhile, the server messages 88, the other-person messages 89, and the self messages 90 are displayed inside frames such as word balloons. Regarding a word balloon, for example, greater the number of characters, the larger is a display size thereof in horizontal and vertical directions.

The storage 44 is used to store a chat application for performing a chat, and to store various computer programs and data. For example, the storage 44 can be used to store frame data of the video display region 42a, the chat display region 42b, and the group display region 42g that are displayed in the display 42. Moreover, the storage 44 is used to store the team information input from the input unit 41.

The controller 45 includes the data acquisition controller 54, the storage controller 55, and the display controller 56. The data acquisition controller 54 accesses the server 130 via the communication unit 43, and acquires the video data, the chat data, and the advertisement setting data stored in the storage 39 of the server 130.

The storage controller 55 stores, in the storage 44, the video data and the chat data, which is acquired from the server 130, in a corresponding manner based on the capture timing and the processing timing. Moreover, the storage controller 55 stores, in the storage 44, the advertisement setting data acquired from the server 130.

The display controller 56 controls the display content that is displayed in the display 42. Herein, based on the video data acquired by the communication unit 43, the display controller 56 controls the display content of the video display region 42a. Moreover, when a scrollbar is displayed in the video display region 42a for enabling a specification of the playback timing of the video, the display controller 56 displays, in the video display region 42a, the video data starting from the playback timing specified using the scrollbar.

Moreover, based on the chat data acquired via the communication unit 43, the display controller 56 controls the display content of the chat display region 42b. When the chat based on the chat data is to be displayed in the chat display region 42b, the display controller 56 displays, in one direction in chronological order, sets of the chat data, the number of which is displayable in the chat display region 42b, based on the upload timings. In the second embodiment, for example, as illustrated in FIG. 11, the chat is displayed in chronological order from the upper side toward the lower side in the chat display region 42b.

When a new set of chat data is stored in the storage 39 of the server 130, the display controller 56 acquires, via the communication unit 43, the latest chat data stored in the storage 39, and updates the display content of the chat display region 42b. In that case, the display controller 56 determines whether or not a space for displaying a new chat is available on the lower side of the recently displayed chat in the chat display region 42b. If a space for displaying a new chat is available, then the display controller 56 displays a new chat in that space. However, if a space for displaying a new chat is not available, then the display controller 56 scrolls the entire chat display region 42b in a direction in which the oldest chat displayed in the chat display region 42b, that is, the uppermost chat displayed in the chat display region 42b is pushed out in the upward direction. Then, the display controller 56 displays a new chat in the lower space that has become available due to the scrolling. Thus, every time a new chat is uploaded in the server 130 and is stored in the storage 44, the display controller 56 can update, in real time, the chat displayed in the chat display region 42b.

Meanwhile, based on the past chat data stored in the storage 44, the display controller 56 can control the display content of the chat display region 42b. For example, when the operator touches the chat display region 42b of the input unit (the touch-sensitive panel) 41 and slides the touched position upward or downward, that is, when the operator performs an operation of manually scrolling the chat display region 42b, according to the scrolling direction and the scrolling amount, the display controller 56 changes the chat to be displayed in the chat display region 42b. For example, if the operator slides the touched position upward, the chat that was uploaded after the currently-displayed chat is displayed in the chat display region 42b. On the other hand, if the operator slides the touched position downward, the chat that was uploaded before the currently-displayed chat is displayed in the chat display region 42b. Meanwhile, in regard to changing the chat to be displayed in the chat display region 42b, the method is not limited to the method explained above, and the change can be made using some other means such as buttons, a keyboard, or a mouse.

Moreover, in the second embodiment, when a single server message in the chat data displayed in the chat display region 42b is specified using the input unit 41, the display controller 56 sends, to the server 130, the information indicating that the server message has been specified. In that case, in the server 130, as explained earlier, the video data selecting unit 36 selects the video data based on the tag range, and the selected video data is sent to the terminal device 40. In the terminal device 40, the communication unit 43 receives the video data. Then, the display controller 56 can display the received video data in the video display region 42a.

Figure 12:
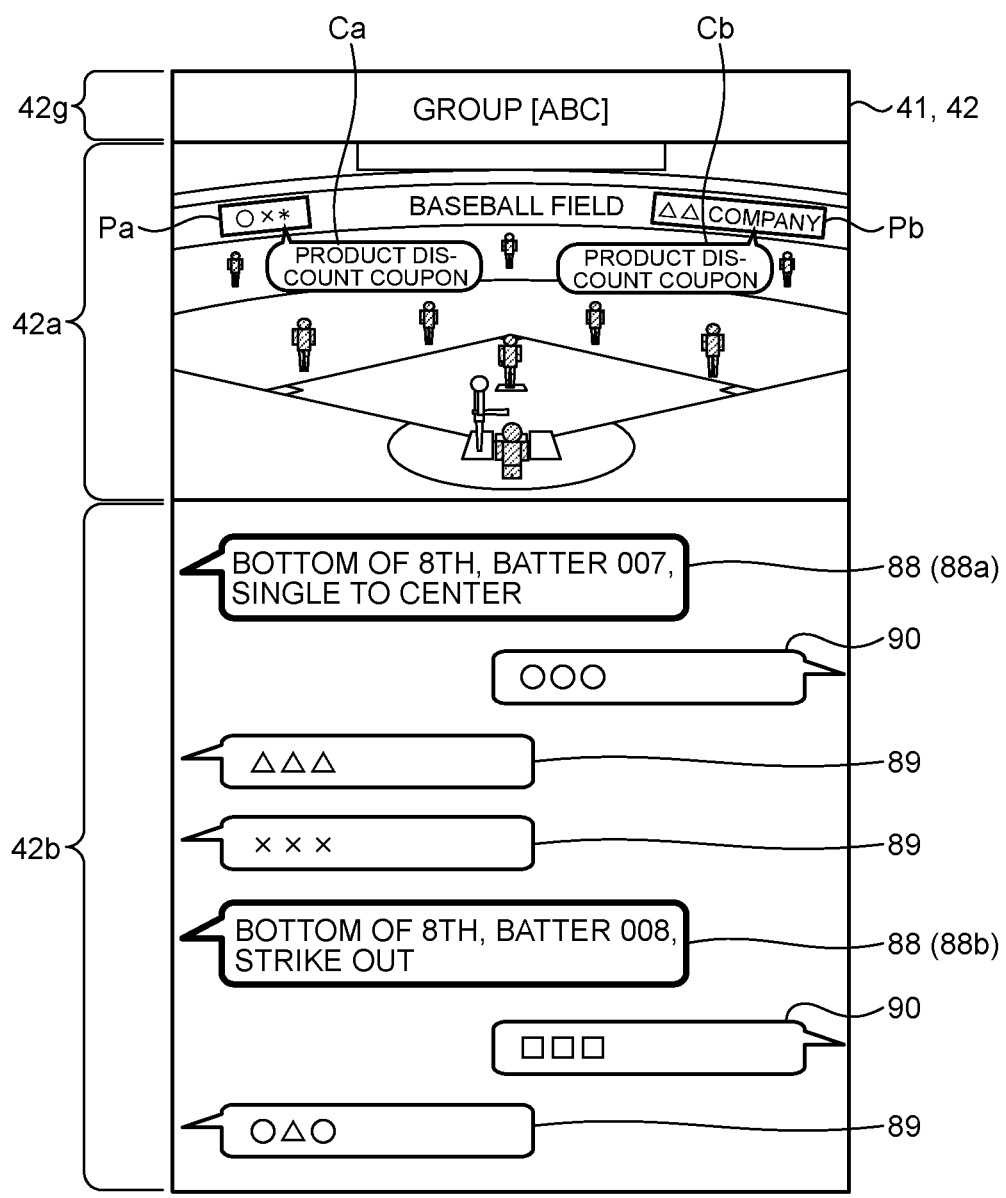
FIG. 12 is a diagram illustrating an example of the display content displayed in the display of the terminal device.

Furthermore, based on the received advertisement setting data, the display controller 56 displays advertisement in the display 42. FIG. 12 is a diagram illustrating an example of the display content that is displayed in the display 42 of the terminal device 40. When the target image data is included in the video data, under the control of the display controller 56, the target images Pa and Pb based on the target image data are displayed in the video display region 42a of the display 42. The target image Pa is a target image of the advertisement client "advertisement client 1" (see FIG. 4). The target image Pb is a target image of the advertisement client "advertisement client 2" (see FIG. 4). When the target images Pa and Pb are displayed in the video display region 42a, based on the advertisement setting data, the display controller 56 displays, for example, the advertisements Ca and Cb of the advertisement clients corresponding to the target images Pa and Pb in the display 42.

As illustrated in FIG. 12, the display controller 56 can display, in the video display region 42a, the advertisements Ca and Cb in a corresponding manner to the target images Pa and Pb, respectively. For example, the display controller 56 displays the advertisement Ca in a word balloon originating from the target image Pa, and displays the advertisement Cb in a word balloon originating from the target image Pb. Hence, the target images Pa and Pb can be directly associated to the advertisements Ca and Cb, respectively.

Figure 13:
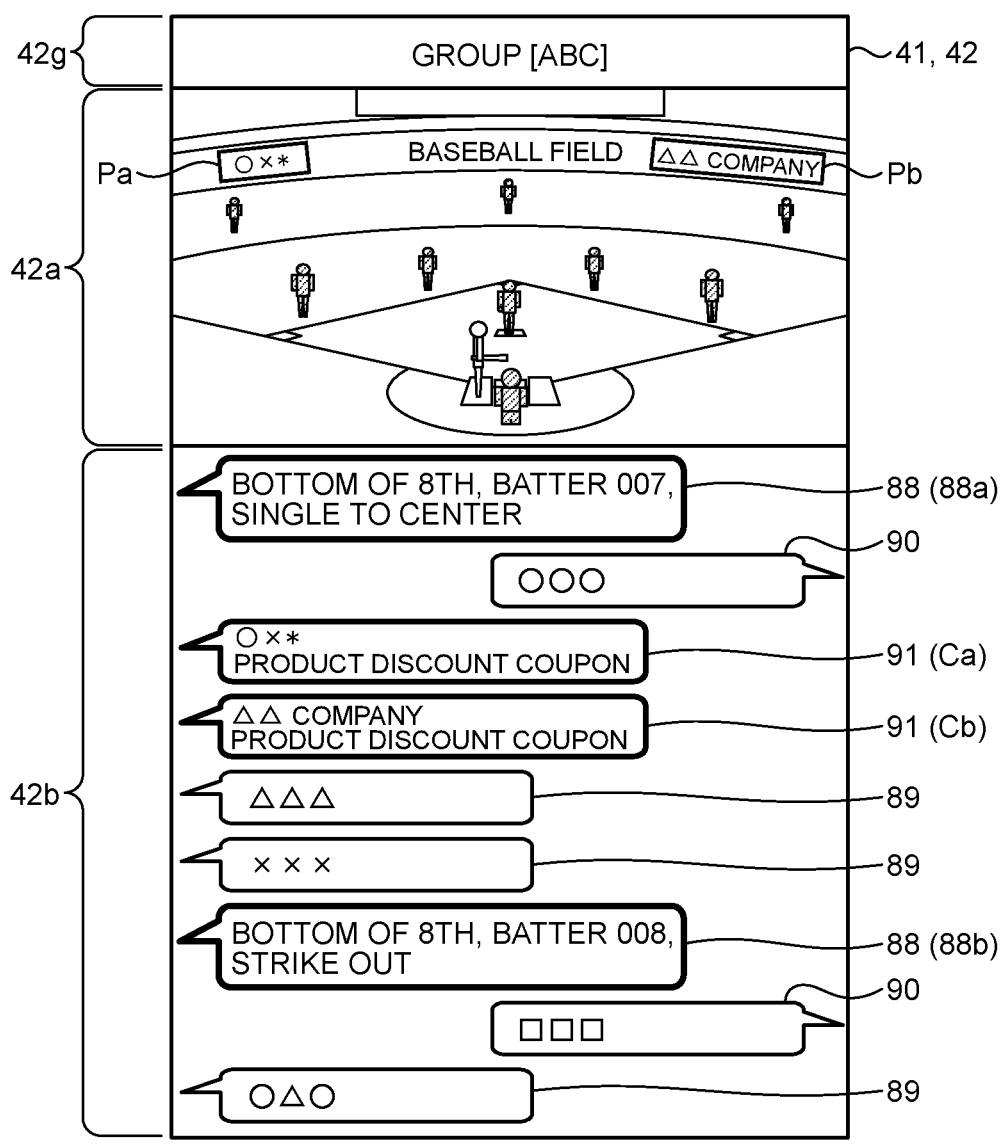
FIG. 13 is a diagram illustrating another example of the display content displayed in the display of the terminal device.

FIG. 13 is a diagram illustrating another example of the display content in the display 42 of the terminal device 40. As illustrated in FIG. 13, the display controller 56 can display the advertisements Ca and Cb in the chat display region 42b. When the advertisement chat data is received from the server 30, the display controller 56 displays, in the chat display region 42b, an advertisement chat 91 that is based on the advertisement chat data. In the advertisement chat 91, the advertisements Ca and Cb of the advertisement clients corresponding to the target images Pa and Pb are included.

Figure 14:
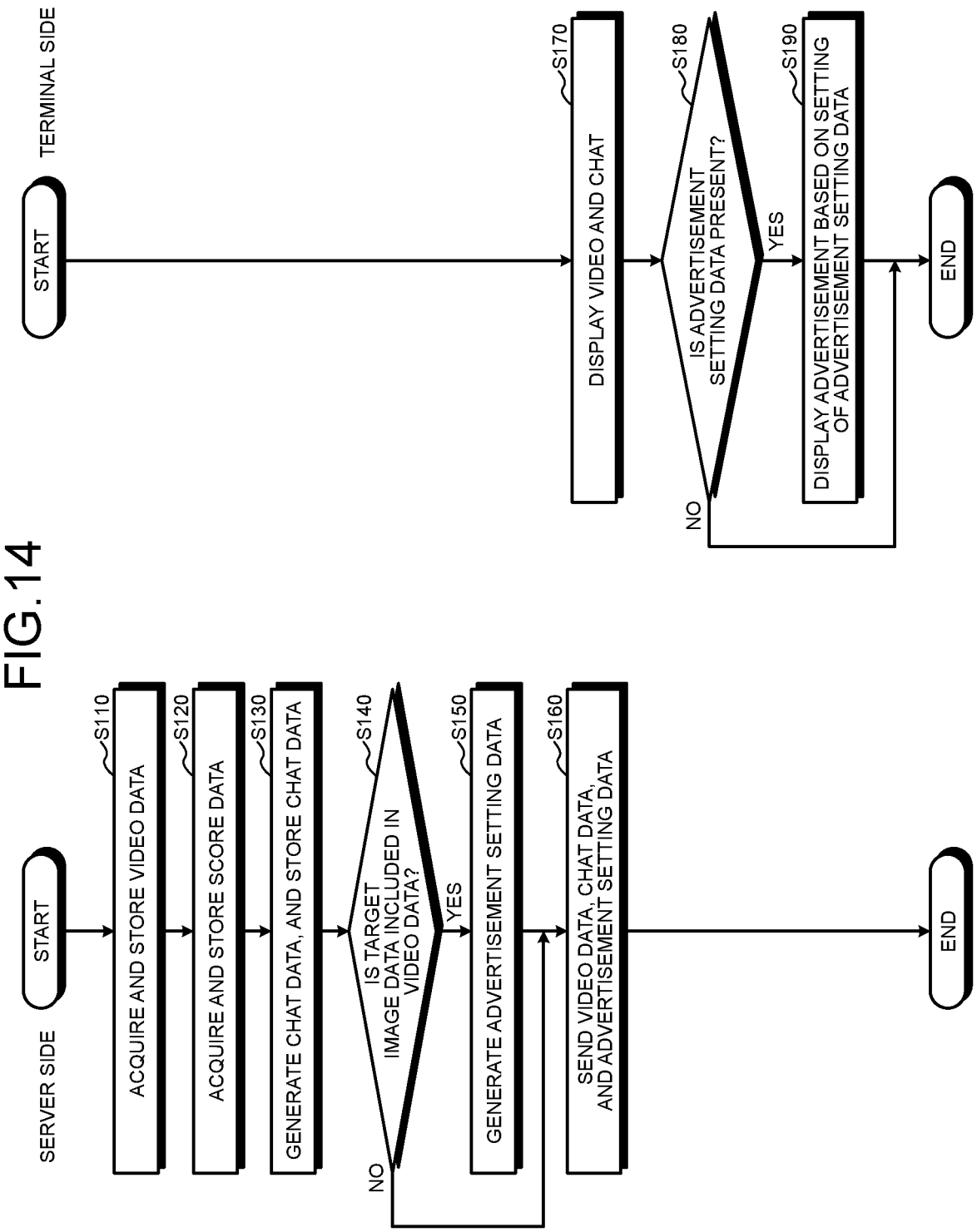
FIG. 14 is a flowchart for explaining an example of a chat display method according to the second embodiment.

FIG. 14 is a flowchart for explaining an example of a chat display method according to the second embodiment. In FIG. 14, regarding the operations performed in the server 130 and the operations performed in the terminal device 40, separate flowcharts are illustrated.

As illustrated in FIG. 14, in the server 130, the video data acquiring unit 31 acquires the video data input from the cameras 10, and stores it in the storage 39 (Step S110). The score data acquiring unit 32 acquires the score data input from the score input unit 20, and stores it in the storage 39 (Step S120). Every time a set of score data is input, the chat data processing unit 33 generates chat data having the content corresponding to the score data, and stores the chat data in the storage 39 (Step S130). Then, the tag information setting unit 34 sets the tag range as the tag information.

The image determining unit 37 determines whether or not the target image data is included in the video data (Step S140). At Step S140, when a particular team is selected in the terminal device 40, the image determining unit 37 acquires the team data about that team. When the team data is acquired, the image determining unit 37 determines whether or not the target image data is included in the video data in which the selected team is imaged, but does not determine whether or not the target image data is included in the remaining video data. At Step S140, if the image determining unit 37 determines that the target image data is included in the video data (Yes at Step S140), then the advertisement setting unit 38 generates the advertisement setting data to be used for displaying, in the display, advertisement of the advertisement client corresponding to the target image data (Step S150). At Step S150, for example, if the user of the terminal device 40 selects a particular team and the target image data is included in the video data in which the selected team is imaged, the advertisement setting unit 38 performs setting in such a way that, at the time when the video based on the video data regarding the selected team is displayed in the external display, the advertisement corresponding to the target image is also displayed in the external display. Meanwhile, if the image determining unit 37 determines that the target image data is not included in the video data (No at Step S140), then the advertisement setting unit 38 skips the operation at Step S150. The server-side communication unit 35 sends the video data and the chat data and, also sends the advertisement setting data when it has been generated (Step S160).

In the terminal device 40, a variety of the data sent from the server 130 is received. The display controller 56 displays, in the display 42, the video based on the video data and the chat based on the chat data (Step S170). The display controller 56 determines whether or not the advertisement setting data is present (Step S180). If it is determined that the advertisement setting data is present (Yes at Step S180), then the display controller 56 displays the advertisement based on the setting of the advertisement setting data (Step S190). On the other hand, when it is determined that the advertisement display setting is not available, such as when the advertisement setting data is not received or when the display form data of the advertisement setting data is set to entirely non-display (No at Step S180), the operation at Step S190 is skipped.

As explained above, the chat system 200 according to the second embodiment includes the server 130 that further includes followings: the video data acquiring unit 31 configured to acquire the video data in which a game is imaged; the chat data processing unit 33 configured to be capable of at least one of acquiring the chat data related to the game and generating the chat data related to the game; the storage 39 configured to store the video data and the chat data; the image determining unit 37 configured to determine whether or not the target image data, which is the data of the target image indicating the advertisement client, is included in the stored video data; the advertisement setting unit 38 configured to generate, when the target image data is included in the video data, the advertisement setting data at the time when the video based on the video data and the chat based on the chat data are displayed in the external display 42, the advertisement setting data being to be used for displaying, in the external display 42, the advertisement of the advertisement client corresponding to the target image; and the server-side communication unit 35 configured to be capable of sending the video data, the chat data, and the advertisement setting data to the outside thereof. Moreover, the chat system 200 according to the second embodiment includes the terminal device 40 that further includes followings: the display 42; the communication unit 43 configured to communicate information with the server-side communication unit 35; and the display controller 56 configured to display, in the display 42, the video and the chat based on the video data and the chat data received via the communication unit 43 and, when the advertisement setting data is received via the communication unit 43, display, in the display 42, the advertisement based on the advertisement setting data.

According to the second embodiment, in the server 130, when the target image data is included in the video data, the advertisement setting data is generated in such a way that the advertisement of the advertisement client corresponding to the target image data is displayed. In the terminal device 40, the advertisement is displayed based on the advertisement setting data. As a result, the advertisement of the advertisement client is displayed which is recognized by the user in the display 42, thereby enabling an advertisement delivery based on information having high effectiveness.

In the chat system 200 according to the second embodiment, when the user of the terminal device 40 selects a particular team, the image determining unit 37 determines whether or not the target image data is included in the image data in which the selected team is imaged. As a result, the advertisement can be displayed when the user of the terminal device 40 is looking at the relevant video.

In the chat system 200 according to the second embodiment, the advertisement setting unit 38 sets the advertisement setting data in such a way that the advertisement is displayed in at least one of the video display region 42a for displaying the videos in the display 42 and the chat display region 42b for displaying the chat in the display 42. As a result, the advertisement can be displayed for the user who is looking at the video and for the user who is looking at the chat.

In the chat system 200 according to the second embodiment, in the case of displaying the advertisement in the chat display region 42b, the advertisement setting unit 38 generates the chat data in such a way that the content of the advertisement is included in the chat displayed in the chat display region 42b. As a result, the advertisement can be displayed in an effective manner to the user who is looking at the chat.

Third Embodiment

Given below is an explanation of a third embodiment. In the third embodiment, a chat system is used that has a substantially identical configuration to the second embodiment. In the following explanation, the configuration of the constituent elements is explained using the same names and the same reference numerals as in the chat system according to the second embodiment. When a configuration is identical to the second embodiment, the corresponding explanation is either not repeated or is given in a simplified manner.

In the third embodiment, when chat data equivalent to a server message generated by the chat data processing unit 33 is specified in the terminal device 40, the video data selecting unit 36 detects the tag range corresponding to the specified chat data. Then, the video data selecting unit 36 selects the video data from the start timing of the tag range. In the following explanation, the video data in the selected range is referred to as selected video data. Subsequently, the video data selecting unit 36 sends the selected video data to the terminal device 40 via the server-side communication unit 35.

With the specification of the chat data in the terminal device 40 serving as a trigger, the image determining unit 37 determines whether or not the target image data, which represents the data of the target image indicating the advertisement client, is included in the selected video data. The image determining unit 37 compares the target image data stored in the storage 39 with the selected video data, and performs an image-processing-based determination about whether or not the target image data is included in the selected video data.

The advertisement setting unit 38 sets the display form of the advertisement at the time when the video based on the selected video data is displayed in the external display. If the target image data of the advertisement client is included in the selected video data, then the advertisement setting unit 38 performs setting in such a way that, at the time when the video based on the selected video data is displayed in the external display, the advertisement corresponding to the target image is also displayed in the display. In the third embodiment, when the target image data of the advertisement client is included in the selected video data, the advertisement setting unit 38 can perform setting in such a way that the video based on the selected video data is displayed in at least one of the video display region 42a (explained later) and the chat display region 42b (explained later) of the display 42. Moreover, the advertisement setting unit 38 can generate the chat data in such a way that the content of the advertisement is included in the chat displayed in the chat display region 42b (hereinafter, referred to as advertisement chat data). Furthermore, in an identical manner to the second embodiment, the advertisement setting unit 38 can perform setting in such a way that, while the target image is being displayed in the display, the advertisement is also displayed in the display. Moreover, the advertisement setting unit 38 can perform setting in such a way that the target image and the advertisement is displayed in a corresponding manner in the display. Furthermore, the advertisement setting unit 38 can perform setting in such a way that the advertisement of the advertisement client corresponding to the target image data not included in the selected video data is not displayed.

Moreover, in an identical manner to the second embodiment, the advertisement setting unit 38 can change the display form of the advertisement according to at least one of the duration of the display of the target image and the display scene count of the target image. For example, the advertisement setting unit 38 can change the display content of the advertisement according to the duration of the display of the target image and the display scene count of the target image. In that case, if the duration of the display of the target image is shorter than a predetermined threshold value or if the display scene count of the target image is smaller than a predetermined threshold value, then the advertisement setting unit 38 sets, for example, an introduction of products as the advertisement content. On the other hand, if the duration of the display of the target image is longer than the predetermined threshold value or if the display scene count of the target image is greater than the predetermined threshold value, then the advertisement setting unit 38 sets, for example, a provision of coupons as the advertisement content. Meanwhile, the advertisement setting unit 38 can set the duration of the display of the advertisement according to the duration of the display of the target image and the display scene count of the target images. In that case, the display controller 56 can set the duration of the display of the advertisement in proportion to the duration of the display of the target image. Moreover, the display controller 56 can set the duration of the display of the advertisement in proportion to the display scene count of the target image. Meanwhile, the details about changing the display form of the advertisement is not limited to the explanation given above, and other display forms can be changed too.

In the third embodiment, the storage 39 is configured to store an advertisement setting program that causes a computer to perform following operations: an operation for acquiring the video data in which a game is imaged; an operation for acquiring the game situation data of the game; an operation of generating, when the game situation data is acquired, chat data having the content corresponding to the game situation data; an operation for storing the video data, the game situation data, and the chat data in a corresponding manner according to the timing; an operation of selecting, when one of the sets of the generated chat data stored in the storage 39 is specified in an external terminal device, the video data starting from a timing corresponding to the specified chat data; an operation for determining, with the specification of the chat data in the terminal device serving as a trigger, whether or not the target image data, which represents the data of the target image indicating the advertisement client, is included in the selected video data; an operation of generating, when the target image data is included in the selected video data, the advertisement setting data that is to be used for displaying, in the display of the terminal device, the advertisement of the advertisement client corresponding to the target image; and an operation of sending the video data in which the selected video data is included, the chat data, and the advertisement setting data to the terminal device, and receiving the specification of the chat data from the terminal device.

The terminal devices 40 and 40A respectively include the input unit 41, the display 42, the communication unit 43, the storage 44, and the controller 45. Thus, the terminal devices 40 and 40A have an identical configuration to the second configuration.

The controller 45 includes the data acquisition controller 54, the storage controller 55, and the display controller 56. The data acquisition controller 54 and the storage controller 55 have an identical configuration to the second embodiment.

In the third embodiment, in an identical manner to the second embodiment, when a single server message of the chat data displayed in the chat display region 42b is specified using the input unit 41, the display controller 56 sends, to the server 130, the information indicating that the server message has been specified. In that case, as explained earlier, in the server 130, the video data selecting unit 36 selects the video data based on the tag range, and the selected video data is sent to the terminal device 40. In the terminal device 40, the communication unit 43 receives the video data. Then, the display controller 56 can display the received video data in the video display region 42a.

Moreover, in the third embodiment, with the specification of the server message using the input unit 41 serving as a trigger, the image determining unit 37 of the server 130 performs a target image determination, and the advertisement setting unit 38 generates the advertisement setting data according to the determination result. Then, the generated advertisement setting data is sent to the terminal device 40 via the server-side communication unit 35. Based on the received advertisement setting data, the display controller 56 displays the advertisement in the display 42. Herein, the advertisement is displayed in an identical manner to the second embodiment.

Figure 15:
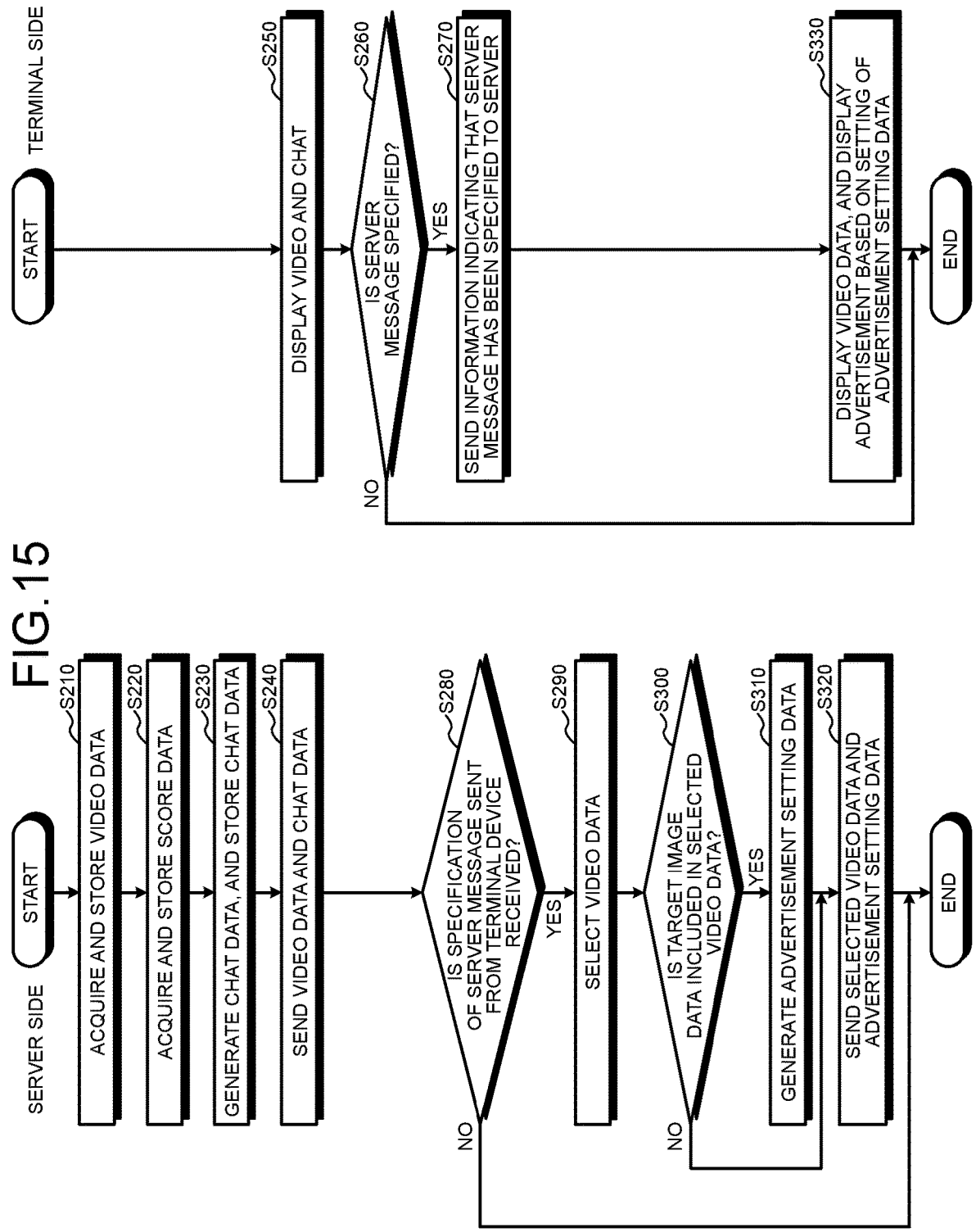
FIG. 15 is a flowchart for explaining an example of a chat display method according to a third embodiment.

FIG. 15 is a flowchart for explaining an example of a chat display method according to the third embodiment. In FIG. 15, regarding the operations performed in the server 130 and the operations performed in the terminal device 40, separate flowcharts are illustrated.

As illustrated in FIG. 15, in the server 130, the video data acquiring unit 31 acquires the video data input from the cameras 10, and stores it in the storage 39 (Step S210). The score data acquiring unit 32 acquires the score data input from the score input unit 20, and stores it in the storage 39 (Step S220). Every time a set of score data is input, the chat data processing unit 33 generates chat data having the content corresponding to the score data, and stores the chat data in the storage 39 (Step S230). Then, the tag information setting unit 34 sets the tag range as the tag information. The server-side communication unit 35 sends the video data and the chat data (Step S240).

In the terminal device 40, a variety of the data sent from the server 130 is received. The display controller 56 displays, in the display 42, the video based on the video data and the chat based on the chat data (Step S250). Then, the display controller 56 determines whether or not, the server message in the chat data displayed in the chat display region 42b is specified using the input unit 41 (Step S260). If it is determined that the server message is specified using the input unit 41 (Yes at Step S260), then the display controller 56 sends, to the server 130, information indicating that the server message has been specified (Step S270). On the other hand, if it is determined that the server message is not specified using the input unit 41 (No at Step S260), then the display controller 56 skips the subsequent operations. Alternatively, if it is determined that the server message is not specified using the input unit 41 (No at Step S260), then the display controller 56 can again perform the same operation at Step S260.

In the server 130, the video data selecting unit 36 determines whether or not the specification of the server message sent from the terminal device 40 is received (Step S280). If it is determined that the specification of the server message is received (Yes at Step S280), then the video data selecting unit 36 selects the video data corresponding to the specified server message (Step S290). On the other hand, if it is determined that the specification of the server message is not received (No at Step S280), then the video data selecting unit 36 skips the subsequent operations. Alternatively, if it is determined that the specification of the server message is not received (No at Step S280), then the video data selecting unit 36 can again perform the same operation at Step S280.

When the video data is selected, the image determining unit 37 determines whether or not the target image data is included in the selected video data (Step S300). If the image determining unit 37 determines that the target image data is included in the selected video data (Yes at Step S300), then the advertisement setting unit 38 generates the advertisement setting data to be used for displaying, in the display, the advertisement of the advertisement client corresponding to the target image data (Step S310). On the other hand, if the image determining unit 37 determines that the target image data is not included in the selected video data (No at Step S300), then the advertisement setting unit 38 skips the operation at Step S310. Then, the server-side communication unit 35 sends the selected video data, as well as sends the advertisement setting data if it has been generated (Step S320).

In the terminal device 40, a variety of the data sent from the server 130 is received. The display controller 56 displays, in the display 42, the video based on the selected video data, and, when the advertisement setting data is present, displays the advertisement based on the setting of the advertisement setting data (Step S330). On the other hand, if the advertisement setting data is not present, then the display controller 56 does not display the advertisement and only displays, in the display 42, the video based on the selected video data.

As explained above, the chat system according to the third embodiment includes the server 130 that further includes followings: the video data acquiring unit 31 configured to acquire the video data in which a game is imaged; the score data acquiring unit 32 configured to acquire the game situation data of the game; the chat data processing unit 33 configured to generate, when the game situation data is acquired, the chat data having the content corresponding to the game situation data; the storage 39 configured to store the video data, the game situation data, and the chat data in a corresponding manner according to a timing; the video data selecting unit 36 configured to select, when one of the sets of the chat data generated by the chat data processing unit 33 and stored in the storage 39 is specified in the external terminal device 40, the video data starting from the timing corresponding to the specified chat data; the image determining unit 37 configured to determine, with the specification of the chat data in the terminal device 40 serving as a trigger, whether or not the target image data, which represents the data of the target images indicating the advertisement client, is included in the selected video data; the advertisement setting unit 38 configured to generate, when the target image data is included in the selected video data, the advertisement setting data to be used for displaying, in the display 42, the advertisement of the advertisement client corresponding to the target image data; and the server-side communication unit 35 configured to be capable of sending the video data containing the selected video data, the chat data, and the advertisement setting data to the terminal device 40, and receiving the specification of the chat data from the terminal device 40. Moreover, the chat system according to the third embodiment includes the terminal device 40 that further includes followings: the display 42; the communication unit 43 configured to communicate information with the server-side communication unit 35; and the display controller 56 configured to display, in the display 42, the video and the chat based on the video data and the chat data received via the communication unit 43, to inform, when one of the sets of the chat data generated by the chat data processing unit 33 and displayed in the display 42 is specified using the input unit 41, the server 130 that the chat is specified, to receive the selected video data selected by the video data selecting unit 36 and display it in the display 42, and to display, when the advertisement setting data is received, the advertisement in the display 42 based on the advertisement setting data.

According to the third embodiment, in the server 130, with the specification of the chat data in the terminal device 40 serving as a trigger, when the target image data is included in the video data, the advertisement setting data is generated for displaying the advertisement of the advertisement client corresponding to the target image data. Thus, in the terminal device 40, the advertisement is displayed based on the advertisement setting data. As a result, the advertisement is displayed in the display 42 in which the selected video, which the user particularly wishes to watch, is displayed. That enables an advertisement delivery based on information having high effectiveness.

In the chat system according to the third embodiment, the advertisement setting unit 38 updates the display form of the advertisement according to at least one of the duration of the display of the target image displayed in the selected video data and the display scene count of the target image. As a result, the display form of the advertisement can be changed according to a level of recognition of the target image by the user.

In the chat system according to the third embodiment, the display form includes the duration of the display of the advertisement. As a result, the duration of the display of the advertisement can be changed according to a level of recognition of the target image by the user.

Fourth Embodiment

Given below is an explanation of a fourth embodiment. In the fourth embodiment, a chat system is used that has a substantially identical configuration to the second embodiment. In the following explanation, the configuration of the constituent elements is explained using the same names and the same reference numerals as in the chat system according to the second embodiment. When a configuration is identical to the second embodiment, the corresponding explanation is either not repeated or is given in a simplified manner.

In the fourth embodiment, when the target image data of the advertisement client is included in the video data, the advertisement setting unit 38 generates, at the time when the video based on the video data is displayed in the display 42 of the terminal device 40, the advertisement setting data that is to be used for displaying, in the display of the terminal device, the advertisement corresponding to an attribute of the terminal device 40 from among the advertisements of the advertisement clients corresponding to the target image. In the fourth embodiment, the attribute of the terminal device 40 include a role of the user of the terminal device 40 in a game. The role includes, for example, a fielding position in a baseball game. Moreover, the attribute of the terminal device 40 can be the age and the gender of the user of the terminal device 40. The attribute of the terminal device 40 can be input as attribute information using, for example, the input unit 41 of the terminal device 40. The attribute information that is input from the input unit 41 can be stored in, for example, the storage 44. When the terminal device 40 performs communication with the server 130, the attribute information stored in the storage 44 is sent to the server 130 via the communication unit 43 under the control of the controller 45. Meanwhile, the configuration can be such that the attribute information is input in the terminal device 40 based on a command issued by the server 130.

The advertisement setting unit 38 acquires the attribute of the terminal device 40. After acquiring the attribute of the terminal device 40, the advertisement setting unit 38 sets the advertisement setting data in such a way that the display content is in accordance with the attribute. For example, an explanation is given about a case in which the advertisement client is a sporting-goods store and the advertisement content is about a variety of equipment used in a baseball game or practice. When a fielding position of the user of the particular terminal device 40 is the catcher, the advertisement setting unit 38 can select the advertisement about the catcher's mitt as a product from among the advertisement of a variety of equipment, and can set the advertisement setting data in such a way that the selected advertisement is displayed in the display 42. Alternatively, when the user of the terminal device 40 is a child, the advertisement setting unit 38 can select the advertisement about equipment for children as products, and can set the advertisement setting data in such a way that the selected advertisement is displayed in the display 42.

FIG. 16 is a diagram illustrating an example of the advertisement setting data stored in the storage 39. Herein, advertisement setting data 370 includes the client data 71, the target image data 72, advertisement content data 373, and the display form data 74. The client data 71, the target image data 72, and the display form data 74 are identical to the embodiments described earlier. The advertisement content data 373 indicates the advertisement content and is set according to the attribute of the terminal device 40. According to the attribute of the terminal device 40, the advertisement setting unit 38 can select, from the advertisement content data 373, the advertisement content to be displayed in the display 42 of the terminal device 40, and can set the advertisement content.

In the fourth embodiment, the storage 39 is configured to store an advertisement setting program that causes a computer to perform following operations: an operation for acquiring the video data in which a game is imaged; an operation for at least one of acquiring the chat data related to the game or generating the chat data related to the game; an operation for storing the video data and the chat data; an operation for determining whether or not the target image data, which represents the data of the target image indicating the advertisement client, is included in the stored video data; an operation for generating, when the target image data is included in the video data, the advertisement setting data, at the time when the video based on the video data and the chat based on the chat data are displayed in the display of the terminal device, the advertisement setting data being to be used for displaying, in the display of the terminal device, the advertisement corresponding to the attribute of the terminal device from among the advertisements of the advertisement client corresponding to the target image; and an operation for sending the video data, the chat data, and the advertisement setting data to the terminal device.

In the terminal device 40, the display controller 56 of the controller 45 determines whether or not the advertisement setting data is present and, if it is determined that the advertisement setting data is present, displays the advertisement based on the setting of the advertisement setting data. Thus, as a result of the control performed by the display controller 56, the advertisement corresponding to the attribute of the terminal device 40 is displayed in the display 42. For example, when a position of the user of the terminal device 40 is the catcher, the advertisement introducing the catcher's mitt as a product is displayed. Alternatively, for example, when the user of the terminal device 40 is a child, the advertisement introducing the equipment for children as products is displayed.

Figure 17:
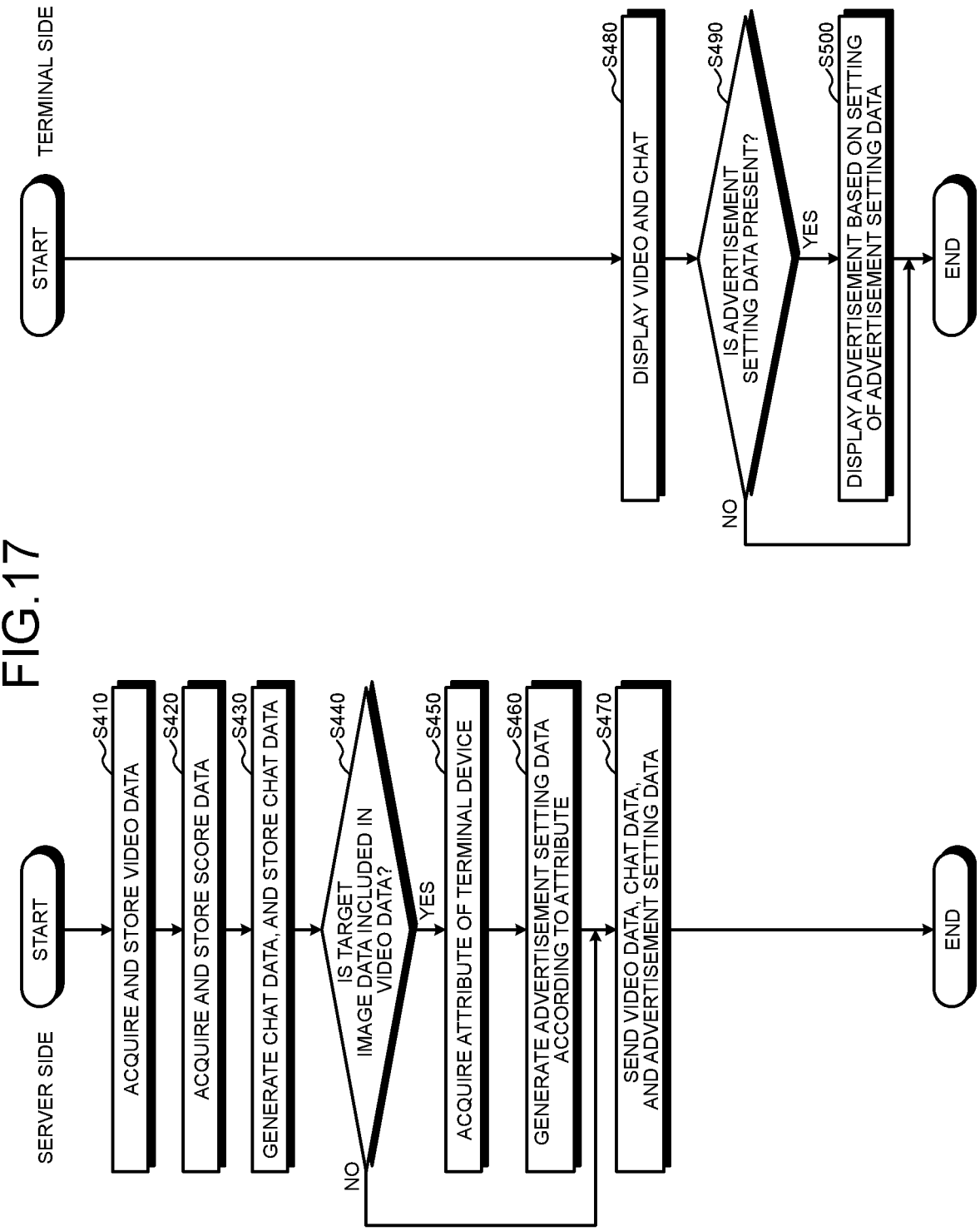
FIG. 17 is a diagram for explaining an example of a chat display method according to a fourth embodiment.

FIG. 17 is a diagram for explaining an example of a chat display method according to the fourth embodiment. In FIG. 17, regarding the operations performed in the server 130 and the operations performed in the terminal device 40, separate flowcharts are illustrated.

As illustrated in FIG. 17, in the server 130, the video data acquiring unit 31 acquires the video data input from the cameras 10, and stores it in the storage 39 (Step S410). The score data acquiring unit 32 acquires the score data input from the score input unit 20, and stores it in the storage 39 (Step S420). Every time a set of score data is input, the chat data processing unit 33 generates chat data having the content corresponding to the score data, and stores the chat data in the storage 39 (Step S430). Then, the tag information setting unit 34 sets the tag range as the tag information.

The image determining unit 37 determines whether or not the target image data is included in the video data (Step S440). At Step S440, if the image determining unit 37 determines that the target image data is included in the video data (Yes at Step S440), then the advertisement setting unit 38 acquires the attribute of the terminal device 40 (Step S450). After acquiring the attribute of the terminal device 40, according to the attribute, the advertisement setting unit 38 generates the advertisement setting data that is to be used for displaying, in the display, the advertisement of the advertisement client corresponding to the target image data (Step S460). On the other hand, if the image determining unit 37 determines that the target image data is not included in the video data (No at Step S440), then the advertisement setting unit 38 skips the operations at Steps S450 and S460. The server-side communication unit 35 sends the video data and the chat data, as well as sends the advertisement setting data if it has been generated (Step S470).

In the terminal device 40, a variety of the data sent from the server 130 is received. The display controller 56 displays, in the display 42, the video based on the video data and the chat based on the chat data (Step S480). Moreover, the display controller 56 determines whether or not the advertisement setting data is present (Step S490). If it is determined that the advertisement setting data is present (Yes at Step S490), then the display controller 56 displays the advertisement based on the setting of the advertisement setting data (Step S500). On the other hand, when it is determined that the advertisement display setting is not available, such as when the advertisement setting data is not received or when the display form data of the advertisement setting data is set to entirely non-display (No at Step S490), the operation at Step S500 is skipped.

As explained above, the chat system according to the fourth embodiment includes the server 130 that further includes followings: the video data acquiring unit 31 configured to acquire the video data in which a game is imaged; the chat data processing unit 33 configured to be capable of at least one of acquiring the chat data related to the game and generating the chat data related to the game; the storage 39 configured to store the video data and the chat data; the image determining unit 37 configured to determine whether or not the target image data, which is the data of the target image indicating the advertisement client, is included in the stored video data; the advertisement setting unit 38 configured to generate, when the target image data is included in the video data, the advertisement setting data at the time when the video based on the video data and the chat based on the chat data are displayed in the display 42 of the terminal device 40, the advertisement setting data being to be used for displaying, in the external display 42 of the terminal device 40, the advertisement in accordance with the attribute of the terminal device 40 from among the advertisements of the advertisement client corresponding to the target image; and the server-side communication unit 35 configured to be capable of sending the video data, the chat data, and the advertisement setting data to the outside thereof. Moreover, the chat system according to the fourth embodiment includes the terminal device 40 that further includes followings: the display 42; the communication unit 43 configured to communicate information with the server-side communication unit 35; and the display controller 56 configured to display, in the display 42, the video and the chat based on the video data and the chat data received via the communication unit 43 and, when the advertisement setting data is received via the communication unit 43, display, in the display 42, the advertisement based on the advertisement setting data.

According to the fourth embodiment, in the server 130, when the target image data is included in the video data, the advertisement setting data is generated in such a way that the advertisement in accordance with the attribute of the terminal device 40 is displayed. In the terminal device 40, the advertisement is displayed based on the advertisement setting data. As a result, an different advertisement for each terminal device 40 can be displayed with flexibility, thereby enabling an advertisement delivery based on information having high effectiveness.

In the chat system according to the fourth embodiment, the attribute include the attribute of the user of the terminal device 40. Moreover, the attribute include the role of the user of the terminal device 40 in a game. Thus, it becomes possible to display the advertisement in accordance with the user of the terminal device 40.

In the chat system according to the fourth embodiment, the terminal device 40 includes the input unit 41 used for inputting information, and the attribute information about the attributes is input using the input unit 41. Thus, the advertisement can be delivered based on the attribute input by the user in the terminal device 40.

Fifth Embodiment

Given below is an explanation of a fifth embodiment. In the fifth embodiment, a chat system is used that has a substantially identical configuration to the second embodiment. In the following explanation, the configuration of the constituent elements is explained using the same names and the same reference numerals as in the chat system according to the second embodiment. When a configuration is identical to the second embodiment, the corresponding explanation is either not repeated or is given in a simplified manner.

In the fifth embodiment, the image determining unit 37 determines whether or not the target image data, which represents the data of the target image indicating a subject to be determined including an advertisement client, is included in the video data. The specific determination details are identical to the embodiments described above.

When the target image data of the subject to be determined is included in the video data, the advertisement setting unit 38 determines whether or not the subject to be determined is a non-client different from the advertisement client. For example, the non-client can be a subject to be determined that has not requested for the display of the advertisement, or can be a subject to be determined that used to be the advertisement client but has now stopped requesting for the display of the advertisement. If it is determined that the subject to be determined is a non-client, then the advertisement setting unit 38 generates the advertisement setting data that, at the time when the video and the chat are displayed in, for example, the display 42 of the terminal device 40, is to be used for displaying, in the display 42, the advertisement of a corresponding client that is a predetermined advertisement client corresponding to the non-client. Examples of a corresponding client include a subject to be determined that provides identical, similar, or relevant products and services as the products and services provided by the non-client. Thus, a corresponding client can be other company in the same industry of the non-client. Meanwhile if it is determined that the subject to be determined is the advertisement client, then the advertisement setting unit 38 generates the advertisement setting data that, at the time when the video and the chat are displayed in, for example, the display 42 of the terminal device 40, is to be used for displaying the advertisement of the advertisement client in the display 42.

At the time of displaying the predetermined advertisement corresponds to the non-client, the advertisement setting unit 38 can display the advertisement in a non-corresponding manner to the target image of the non-client. However, if the subject to be determined corresponding to the target image is the advertisement client, then the advertisement setting unit 38 can display the advertisement of the advertisement client in a corresponding manner to the target image thereof.

FIG. 18 is a diagram illustrating an example of the advertisement setting data stored in the storage 39. Herein, advertisement setting data 470 contains subject-to-be-determined data 75, the target image data 72, the advertisement content data 73, the display form data 74, type data 76, and corresponding client data 77. The target image data 72, the advertisement content data 73, and the display form data 74 are identical to the embodiments described earlier. The subject-to-be-determined data 75 indicates the subject to be determined including the advertisement client. The type data 76 indicates whether the subject to be determined is an advertisement client or a non-client. The corresponding-client data 77 indicates, when the subject to be determined is a non-client, an advertisement client corresponding to the non-client. Depending on whether the subject to be determined of the target image data included in the video data is an advertisement client or a non-client, the advertisement setting unit 38 can set the display content of the advertisement to be displayed in the display 42 of the terminal device 40.

In the fifth embodiment, the storage 39 is configured to store an advertisement setting program that causes a computer to perform following operations: an operation for acquiring the video data in which a game is imaged; an operation for at least one of acquiring the chat data related to the game or generating the chat data related to the game; an operation for storing the video data and the chat data; an operation for determining whether or not the target image data, which represents the data of the target image indicating the subject to be determined including the advertisement client, is included in the stored video data; an operation for generating, when the target image data is included in the video data and when the subject to be determined corresponding to the target image is a non-client different from the advertisement client, the advertisement setting data at the time when the video based on the video data and the chat based on the chat data are displayed in the external display, the advertisement setting data being to be used for displaying, in the external display, the advertisement of a predetermined advertisement client corresponding to the non-client; and an operation for sending the video data, the chat data, and the advertisement setting data to the outside.

In the terminal device 40, the display controller 56 of the controller 45 determines whether or not the advertisement setting data is present, and, if it is determined that the advertisement setting data is present, displays the advertisement based on the advertisement setting data. As a result of the control performed by the display controller 56, when the subject to be determined is the non-client, the advertisement of the predetermined advertisement client corresponding to the non-client is displayed in the display 42.

Figure 19:
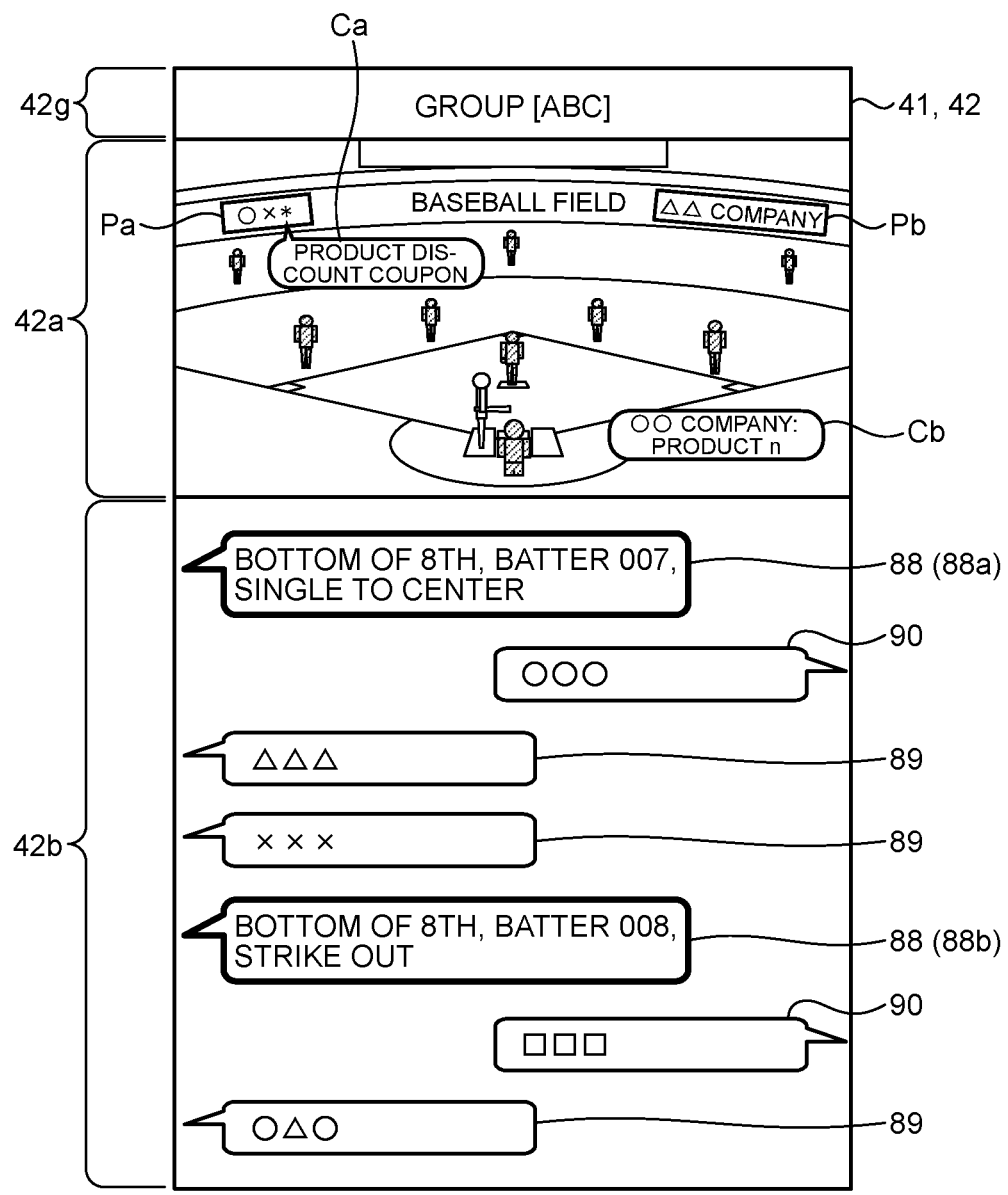
FIG. 19 is a diagram illustrating an example of the input unit and the display of the terminal device.

FIG. 19 is a diagram illustrating an example of the input unit 41 and the display 42 of the terminal device 40 according to the fifth embodiment. In the following explanation, as far as the terms enclosed in double quotes (such as "subject 1" or "subject 2") are concerned, FIG. 18 is referred to. As illustrated in FIG. 19, when the target image data is included in the video data, as a result of the control performed by the display controller 56, the target images Pa and Pb based on the target image data are displayed in the video display region 42a of the display 42. The target image Pa represents the target image of the "subject 1" that is an advertisement client. The target image Pa represents the target image of the "subject 2" that is a non-client.

When the target image Pa of the advertisement client "target 1" is displayed in the video display region 42a, for example, the display controller 56 displays, based on the advertisement setting data, the advertisement Ca of the "target 1" in the display form "display 1" in the display 42. As far as the display form "display 1" is concerned, for example, the form of displaying the advertisement Ca in a corresponding manner to the target image Pb can be cited. In this case, "coupon" represents the advertisement content of the advertisement Ca.

On the other hand, when the target image Pb of the non-client "subject 2" is displayed in the video display region 42a, the display controller 56 displays, based on the advertisement setting data, the advertisement Cb of a "subject n", which represents a corresponding client for the "subject 2", in a display form "display n" in the display 42. As far as the display form "display n" is concerned, for example, the form of displaying the advertisement Cb in a non-corresponding manner to the target image Pb can be cited. Regarding this display form, it is possible to adapt various display forms such as the form of displaying the advertisement Cb and the target image Pb away from each other, or the form in which, unlike the fact that the advertisement Ca is displayed in a word balloon originating from the target image Pa, the advertisement Cb is displayed without illustrating the source of the word balloon. Meanwhile, regarding the advertisement Cb, the advertisement content is "product n".

Figure 20:
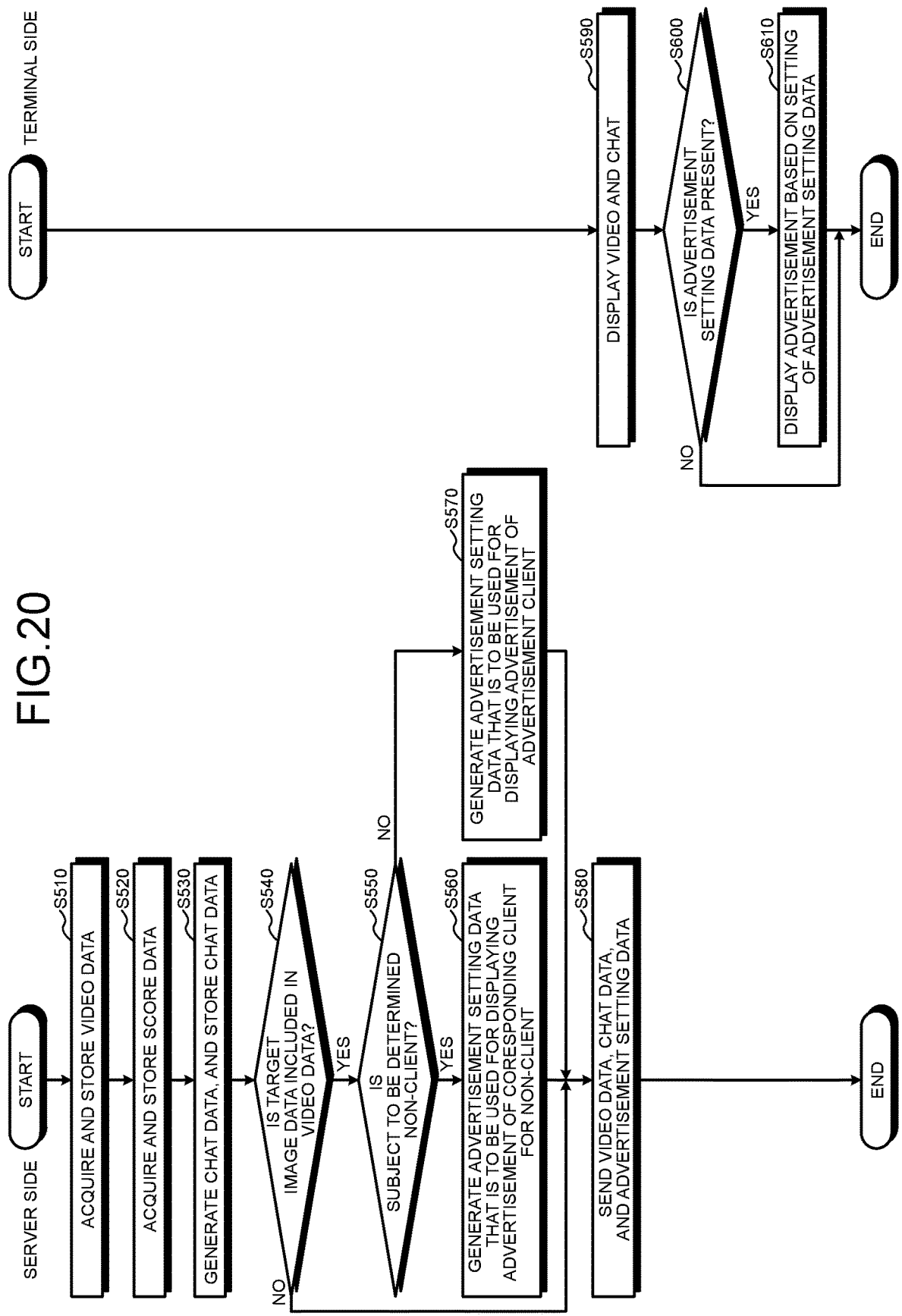
FIG. 20 is a flowchart for explaining an example of a chat display method according to a fifth embodiment.

FIG. 20 is a flowchart for explaining an example of a chat display method according to the fifth embodiment. In FIG. 20, regarding the operations performed in the server 130 and the operations performed in the terminal device 40, separate flowcharts are illustrated.

As illustrated in FIG. 20, in the server 130, the video data acquiring unit 31 acquires the video data input from the cameras 10, and stores it in the storage 39 (Step S510). The score data acquiring unit 32 acquires the score data input from the score input unit 20, and stores it in the storage 39 (Step S520). Every time a set of the score data is input, the chat data processing unit 33 generates chat data having the content corresponding to the score data, and stores the chat data in the storage 39 (Step S530). Then, the tag information setting unit 34 sets the tag range as the tag information.

The image determining unit 37 determines whether or not the target image data is included in the video data (Step S540). At Step S540, if the image determining unit 37 determines that the target image data is not included in the video data (No at Step S540), then the operations at Steps S550, S560, and S570 explained below are skipped, and the system control proceeds to Step S580. On the other hand, at Step S540, if the image determining unit 37 determines that the target image data is included in the video data (Yes at Step S540), then the advertisement setting unit 38 determines whether or not the subject to be determined corresponding to the target image data is a non-client (Step S550). At Step S550, if it is determined that the subject to be determined is the non-client (Yes at Step S550), then the advertisement setting unit 38 generates the advertisement setting data that, at the time when the video and the chat are displayed in, for example, the display 42 of the terminal device 40, is to be used for displaying the advertisement of the corresponding client for the non-client (Step S560). On the other hand, at Step S550, if it is determined that the determination subject is not the non-client (No at Step S550), that is, if it is determined that the determination subject is the advertisement client, then the advertisement setting unit 38 generates the advertisement setting data that, at the time when the video and the chat are displayed in, for example, the display 42 of the terminal device 40, is to be used for displaying the advertisement of the advertisement client (Step S570). Then, the server-side communication unit 35 sends the video data and the chat data, as well as sends the advertisement setting data if it has been generated (Step S580).

In the terminal device 40, a variety of the data sent from the server 130 is received. The display controller 56 displays, in the display 42, the video based on the video data and the chat based on the chat data (Step S590). The display controller 56 determines whether or not the advertisement setting data is present (Step S600). If it is determined that the advertisement setting data is present (Yes at Step S600), then the display controller 56 displays the advertisement based on the advertisement setting data (Step S610). On the other hand, when it is determined that the advertisement display setting is not available, such as when the advertisement setting data is not received or when the display form data of the advertisement setting data is set to entirely non-display (No at Step S600), the operation at Step S610 is skipped.

As explained above, the chat system according to the fifth embodiment includes the server 130 that further includes followings: the video data acquiring unit 31 configured to acquire the video data in which a game is imaged; the chat data processing unit 33 that is capable of at least one of acquiring the chat data related to the game and generating the chat data related to the game; the storage 39 configured to store the video data and the chat data; the image determining unit 37 configured to determine whether or not the target image data, which is the data of the target images indicating the subject to be determined including the advertisement client, is included in the stored video data; the advertisement setting unit 38 configured to generate, when the target image data is included in the video data and when the subject to be determined corresponding to the target image is the non-client different from the advertisement client, the advertisement setting data at the time when the video based on the video data and the chat based on the chat data are displayed in the external display 42, the advertisement setting data being to be used for displaying, in the external display 42, the advertisement of a predetermined advertisement client corresponding to the non-client; and the server-side communication unit 35 configured to be capable of sending the video data, the chat data, and the advertisement setting data to the outside thereof. Moreover, the chat system according to the fifth embodiment includes the terminal device 40 that further includes followings: the display 42; the communication unit 43 configured to communicate information with the server-side communication unit 35; and the display controller 56 configured to display, in the display 42, the video and the chat based on the video data and the chat data received via the communication unit 43 and, when the advertisement setting data is received via the communication unit 43, display, in the display 42, the advertisement based on the advertisement setting data.

According to the fifth embodiment, when the target image data of the non-client is included in the video data, then the advertisement of the advertisement client corresponding to the non-client (i.e., the corresponding client) is displayed in the display 42. That enables displaying the advertisement of the products or the services corresponding to the products or the services offered by the non-client, thereby enabling an advertisement delivery based on information having high effectiveness.

In the chat system according to the fifth embodiment, in the case of displaying the advertisement of the corresponding client for the non-client, the advertisement setting unit 38 displays the advertisement in a non-corresponding manner to the target image of the non-client. As a result, regarding the advertisement of the corresponding client, it becomes possible to avoid any confusion about a source of the advertisement.

In the chat system according to the fifth embodiment, when the subject to be determined corresponding to the target image is the advertisement client, the advertisement setting unit 38 displays the advertisement of the advertisement client in a corresponding manner to the target image thereof. As a result, the source of the advertisement of the advertisement client can be shown clearly. Moreover, if the display form is combined with the display form in which, in the case of displaying the advertisements of the corresponding client for the non-client, the advertisement is displayed in a non-corresponding manner to the target image of the non-client, the sources of the advertisements can be distinguished to be shown more clearly.

Sixth Embodiment

Figure 21:
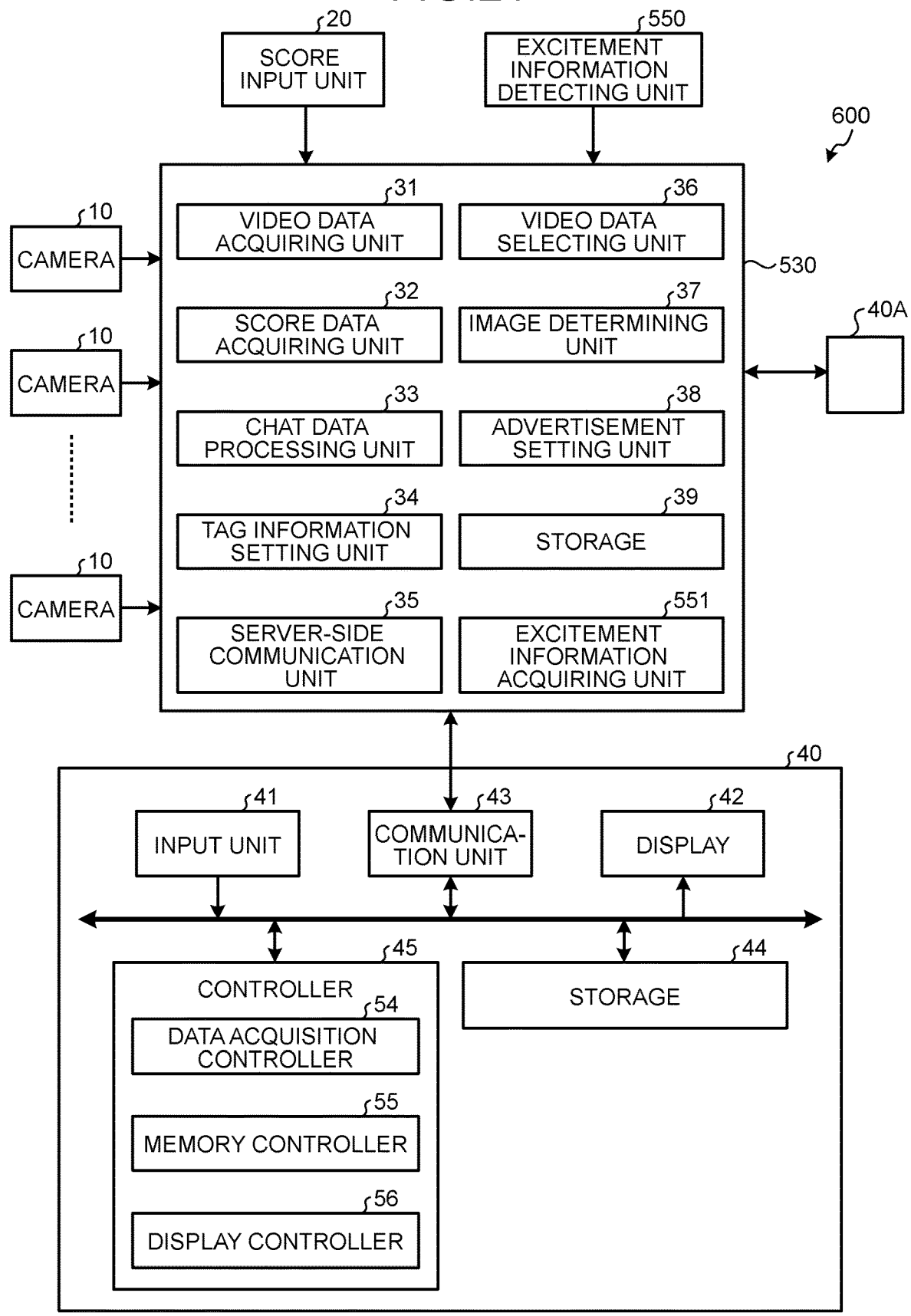
FIG. 21 is a diagram illustrating an example of a chat system according to a sixth embodiment.

Given below is an explanation of a sixth embodiment. FIG. 21 is a diagram illustrating an example of a chat system 600 according to the sixth embodiment. As illustrated in FIG. 21, the chat system 600 includes the cameras 10, the score input unit 20, a server 530, the terminal devices 40 and 40A, an excitement information detecting unit 550. The cameras 10, the score input unit 20, and the terminal devices 40 and 40A have an identical configuration to the second embodiment.

The excitement information detecting unit 550 detects excitement information indicating a level of excitement of a game. For example, as the game becomes exciting, it is highly likely to have large changes in biological information of the players participating in the game, the photographers using the cameras 10, and the user of the terminal device 40. Moreover, as the game becomes exciting, the cheers at the game venue are likely to become louder, and a sound level in the video data is likely to increase. Furthermore, as the game becomes exciting, a luminance of the video data is likely to increase. Moreover, the game becomes exciting for a score such as a homerun, a multi-base hit, or consecutive strikeouts. As the game becomes exciting, the number of chats is likely to increase, and the content of the chat is also likely to become more emotional. In that regard, in the sixth embodiment, the excitement information detecting unit 550 can be configured to be able to detect, for example, following information as the excitement information: biological information of at least one subject from among participants of the game and viewers of the game; a level of sound of the video data; a luminance value of the video data; content of the score data; and content of the chat.

The excitement information can be expressed using, for example, a numerical value. When biological information is detected as the excitement information, for example, a numerical value indicating a level of excitement can be calculated based on a variation of values such as heart rate, respiration rate, blood pressure, body temperature, brain waves, an amount of perspiration, body movements of the subject, and oxygen saturation in arterial blood. For example, it can be estimated that, greater the variation of each value, the greater is the excitement of the subject whose biological information is acquired. Meanwhile, the excitement information is not limited to positive numerical values (indicating excitement), and can also contain negative numerical values (indicating dampened excitement).

In an identical manner to the second embodiment, the server 530 includes the video data acquiring unit 31, the score data acquiring unit (the game situation data acquiring unit) 32, the chat data processing unit 33, the tag information setting unit 34, the server-side communication unit 35, the video data selecting unit 36, the image determining unit 37, the advertisement setting unit 38, and the storage 39. Moreover, in the sixth embodiment, the server 530 further includes an excitement information acquiring unit 551.

The excitement information acquiring unit 551 acquires the excitement information detected by the excitement information detecting unit 550, and stores it in the storage 39 in a corresponding manner to the video data and the chat data according to the timing.

The video data selecting unit 36 selects the video data of a predetermined range from the video data stored in the storage 39, and sends the selected video data to the terminal device 40 via the server-side communication unit 35. The video data selecting unit 36 selects, as selected video data, the video data during the period of time in which, for example, the excitement information is equal to or greater than a predetermined threshold value. In that case, the video data selecting unit 36 searches for the tag range of the period of time in which the excitement information is equal to or greater than the predetermined threshold value, selects the video data from the start timing of that tag range, and sends the selected video data to the terminal device 40 via the server-side communication unit 35.

The image determining unit 37 determines whether or not the target image data, which is the data of the target image, is included within the period of time in which the excitement information is equal to or greater than the predetermined threshold value. For example, the image determining unit 37 compares the target image data stored in the storage 39 with the image data, and performs an image-processing-based determination about whether or not the target image data is included in the video data within the abovementioned period of time.

When the target image data is included in the video data present within the period of time in which the excitement information is equal to or greater than the predetermined threshold value, the advertisement setting unit 38 generates the advertisement setting data that, when the video based on the video data and the chat based on the chat data are displayed in the display 42, is used for displaying, in the display 42 of the terminal device 40, the advertisement of the advertisement client corresponding to the target image.

Meanwhile, the storage 39 is configured to store an advertisement setting program that causes a computer to perform following operations: an operation for acquiring the video data in which a game is imaged; an operation for at least one of acquiring the chat data related to the game and generating the chat data related to the game; an operation for acquiring excitement information indicating the level of excitement during the game; an operation for storing the video data, the chat data, and the excitement information in a corresponding manner according to the timing; an operation for determining whether or not the target image data, which represents the data of the target image indicating the advertisement client, is included in the stored video data; an operation for generating, when the target image data is included in the video data present within the period of time in which the excitement information is equal to or greater than the predetermined threshold value, the advertisement setting data at the time when the video based on the video data and the chat based on the chat data are displayed in the external display, the advertisement setting data being to be used for displaying, in the display 42 of the terminal device 40, the advertisement of the advertisement client corresponding to the target image; and an operation for sending the video data, the chat data, and the advertisement setting data to the outside thereof.

In the terminal device 40, the display controller 56 of the controller 45 determines whether or not the advertisement setting data is present and, if it is determined that the advertisement setting data is present, displays the advertisement based on the setting of the advertisement setting data. As a result of the control performed by the display controller 56, in the display 42 of the terminal device 40, the advertisement based on the advertisement setting data is displayed in the video based on the selected video data within the period of time in which the excitement information is equal to or greater than the predetermined threshold value.

FIG. 22 is a flowchart for explaining an example of a chat display method according to the sixth embodiment. In FIG. 22, regarding the operations performed in the server 530 and the operations performed in the terminal device 40, separate flowcharts are illustrated.

As illustrated in FIG. 22, in the server 530, the video data acquiring unit 31 acquires the video data input from the cameras 10, and stores it in the storage 39 (Step S710). The score data acquiring unit 32 acquires the score data input from the score input unit 20, and stores it in the storage 39 (Step S720). Every time a set of the score data is input, the chat data processing unit 33 generates chat data having the content corresponding to the score data, and stores the chat data in the storage 39 (Step S730). The excitement information acquiring unit 551 acquires the excitement information detected by the excitement information detecting unit 550 (Step S740). Then, the tag information setting unit 34 sets the tag range as the tag information.

The image determining unit 37 determines whether or not the target image data is included in the video data present within the period of time in which the excitement information is equal to or greater than a predetermined threshold value (Step S750). At Step S750, if the image determining unit 37 determines that the target image data is included in the video data within the abovementioned period of time (Yes at Step S750), then the advertisement setting unit 38 generates the advertisement setting data to be used for displaying, in the display, the advertisement of the advertisement client corresponding to the target image data (Step S760). On the other hand, if the image determining unit 37 determines that the target image data is not included in the video data (No at Step S750), then the advertisement setting unit 38 skips the operation at Step S760. Then, the server-side communication unit 35 sends the video data and the chat data, as well as sends the advertisement setting data if it has been generated (Step S770).

In the terminal device 40, a variety of the data sent from the server 130 is received. The display controller 56 displays, in the display 42, the video based on the video data and the chat based on the chat data (Step S780). The display controller 56 determines whether or not the advertisement setting data is present (Step S790). If it is determined that the advertisement setting data is present (Yes at Step S790), then the display controller 56 displays the advertisement based on the setting of the advertisement setting data (Step S800). On the other hand, when it is determined that the advertisement display setting is not available, such as when the advertisement setting data is not received when the display form data of the advertisement setting data is set to entirely non-display (No at Step S790), the operation at Step S800 is skipped.

As explained above, the chat system 600 according to the sixth embodiment includes the server 530 that further includes followings: the video data acquiring unit 31 configured to acquire the video data in which a game is imaged; the chat data processing unit 33 configured to be capable of at least one of acquiring the chat data related to the game and generating the chat data related to the game; the excitement information acquiring unit 551 configured to acquire the excitement information indicating the level of excitement during the game; the storage 39 configured to store the video data, the chat data, and the excitement information in a corresponding manner according to the timing; the image determining unit 37 that determines whether or not the target image data, which is the data of the target image indicating the advertisement client, is included in the stored video data within the period of time in which the excitement information is equal to or greater than a predetermined threshold value; the advertisement setting unit 38 configured to generate, when the target image data is included in the abovementioned period of time, the advertisement setting data at the time when the video based on the video data and the chat based on the chat data are displayed in the external display 42, the advertisement setting data being to be used for displaying, in the external display 42, the advertisement of the advertisement client corresponding to the target image; and the server-side communication unit 35 configured to be capable of sending the video data, the chat data, and the advertisement setting data to the outside thereof. Moreover, the chat system 600 according to the sixth embodiment includes the terminal device 40 that further includes followings: the display 42; the communication unit 43 configured to communicate information with the server-side communication unit 35; and the display controller 56 configured to display, in the display 42, the video and the chat based on the video data and the chat data received via the communication unit 43 and, when the advertisement setting data is received via the communication unit 43, display, in the display 42, the advertisement based on the advertisement setting data.

In the sixth embodiment, in the server 530, when the target image data is included in the video data present within the period of time in which the excitement information is equal to or greater than the predetermined threshold value, an advertisement setting data is generated in such a way that the advertisement of the advertisement client corresponding to the target image data is displayed. In the terminal device 40, the advertisement based on the advertisement setting data is displayed. As a result, since the advertisement is displayed within the period of time in which the game is exciting. That enables an advertisement delivery based on information having high effectiveness.

In the chat system 600 according to the sixth embodiment, the excitement information contains at least one of followings: biological information of at least one subject from among the participants of the game and the viewers of the game; the level of sound of the video data; the luminance value of the video data; the content of the score data; and the content of the chat. Thus, the excitement information can be detected and acquired as numerical values corresponding to the actual excitement during the game.

In the chat system 600 according to the sixth embodiment, the video data selecting unit 36 is also included for selecting the video data present within the period of time in which the excitement information is equal to or greater than a predetermined threshold value. Hence, it becomes possible to deliver the advertisements to the user who is actively attempting to watch the video data present within the period of time in which the excitement information is equal to or greater than the predetermined threshold value.

Meanwhile, the technical scope of the application concerned is not limited to the embodiments described above, and can be appropriately modified within the scope of the application concerned. For example, in the embodiments described above, the configuration can be such that, when a product or a service is purchased via the advertisement displayed in the display, predetermined incentive can be given from the advertisement client to a server operator.

According to the present application, a server, and an advertisement setting method that enable an advertisement delivery based on information having high effectiveness are provided.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising:
a memory that is configured to store computer executable instructions; and
a processor that is configured to execute the computer executable instructions to perform operations, the operations comprise:
acquiring video data in which a game is imaged;
storing the video data in a storage;
determining whether or not target image data, which is data of a target image indicating an advertisement client and which is stored in advance in the storage, is included in the stored video data by comparing the stored video data with the target image data;
generating, when the target image data is included in the video data, advertisement setting data at a time when video based on the video data is displayed in an external display, the advertisement setting data being to be used for displaying, in the external display, an advertisement of the advertisement client corresponding to the target image;
sending the video data and the advertisement setting data to outside;
acquiring game situation data of a game situation of a game input from outside;
processing of at least one of acquiring chat data related to the game and generating chat data having content corresponding to the game situation data; and
selecting, when one set of the chat data generated and stored in the storage is specified in an external terminal device, the video data starting from a timing corresponding to the specified chat data, wherein
the determining further comprising determining whether or not the target image data, which is the data of the target image indicating the advertisement client, is included in the selected video data with specification of the chat data in the external terminal device serving as a trigger, and
the generating further comprising changing a duration of display of the advertisement according to at least one of a duration of display of the target image displayed in the video data and a number of display scenes of the target image.

2. The server according to claim 1, wherein the generating further comprises setting the advertisement setting data in such a way that, during a period of time in which the target image is displayed in the external display, the advertisement is also displayed in the external display.

3. The server according to claim 1, wherein the generating further comprises generating, when the target image data is included in the video data, the advertisement setting data at a time when the video based on the video data is displayed in a display of a terminal device, the advertisement setting data being to be used for displaying, in the display of the terminal device, the advertisement according to attribute of a user of the terminal device from among the advertisements of the advertisement client corresponding to the target image.

4. The server according to claim 1, wherein the operations further comprise acquiring excitement information indicating a level of excitement during the game, wherein
the storing further comprises storing the video data, the chat data, and the excitement information in a corresponding manner according to a timing, and
the determining further comprises determining whether or not the target image data, which is the data of the target image indicating the advertisement client, is included in the stored video data present within a predetermined period of time in which the excitement information is equal to or greater than a predetermined threshold value.

5. The server according to claim 4, wherein the excitement information contains at least one of biological information of at least one subject from among participants of the game and viewers of the game, a level of sound of the video data, a luminance value of the video data, content of the game situation data, and content of the chat.

6. A server comprising:
a memory that is configured to store computer executable instructions; and
a processor that is configured to execute the computer executable instructions to perform operations, wherein the operations comprise:
acquiring video data in which a game is imaged;
processing at least one of acquiring chat data related to the game and generating chat data related to the game;
storing the video data and the chat data in a storage;
determining whether or not target video data, which is data of a target image indicating a subject to be determined including an advertisement client and which is stored in advance in the storage, is included in the stored video data by comparing the stored video data with the target image data;
generating, when the target image data is included in the video data and when the subject to be determined corresponding to the target image is a non-client different from the advertisement client, advertisement setting data at a time when video based on the video data and chat based on the chat data are displayed in an external display, the advertisement setting data being to be used for displaying, in the external display, an advertisement of a predetermined advertisement client corresponding to the non-client;
sending the video data, the chat data, and the advertisement setting data to outside;
acquiring game situation data of a game situation of a game input from outside; and
selecting, when one set of the chat data generated and stored in the storage is specified in an external terminal device, the video data starting from a timing corresponding to the specified chat data, wherein
the determining further comprises determining whether or not the target image data, which is the data of the target image indicating the advertisement client, is included in the selected video data with specification of the chat data in the external terminal device serving as a trigger, and the generating further comprises changing a duration of display of the advertisement according to at least one of a duration of display of the target image displayed in the video data and a number of display scenes of the target image.

7. The server according to claim 6, wherein, at a time of displaying the advertisement of the predetermined advertisement client corresponding to the non-client, the generating further comprises displaying the advertisement in a non-corresponding manner to the target image of the non-client.

8. An advertisement setting method comprising:
acquiring video data in which a game is imaged;
acquiring game situation data of the game;
storing the video data and the game situation data in a storage;
determining whether or not target video data, which is data of a target image indicating an advertisement client and which is stored in advance, is included in the stored video data by comparing the stored video data with the target image data;
generating, when the target image data is included in the video data, advertisement setting data at a time when video based on the video data is displayed in an external display, the advertisement setting data being to be used for displaying, in the external display, an advertisement of the advertisement client corresponding to the target image;
sending the video data, the game situation data, and the advertisement setting data to outside;
acquiring game situation data of a game situation of a game input from outside;
processing of at least one of acquiring chat data related to the game and generating chat data having content corresponding to the game situation data; and
selecting, when one set of the chat data generated and stored in the storage is specified in an external terminal device, the video data starting from a timing corresponding to the specified chat data, wherein the determining further comprises determining whether or not the target image data, which is the data of the target image indicating the advertisement client, is included in the selected video data with specification of the chat data in the external terminal device serving as a trigger, and the generating further comprises changing a duration of display of the advertisement according to at least one of a duration of display of the target image displayed in the video data and a number of display scenes of the target image.

* * * * *